(12) United States Patent
Mohan et al.

(10) Patent No.: US 7,869,236 B2
(45) Date of Patent: Jan. 11, 2011

(54) CARRIER-BASED PULSE-WIDTH MODULATION (PWM) CONTROL FOR MATRIX CONVERTERS

(75) Inventors: Ned Mohan, Saint Paul, MN (US); Krushna K. Mohapatra, Minneapolis, MN (US); Satish Thuta, Minneapolis, MN (US); Gaurav K. Aggarwal, Minneapolis, MN (US); Philip Jose, Moshi (IN)

(73) Assignee: Regents of the University of Minnesota, St. Paul, MN (US)

( * ) Notice: Subject to any disclaimer, the term of this patent is extended or adjusted under 35 U.S.C. 154(b) by 818 days.

(21) Appl. No.: 11/752,110

(22) Filed: May 22, 2007

(65) Prior Publication Data

US 2007/0268728 A1 Nov. 22, 2007

Related U.S. Application Data

(60) Provisional application No. 60/802,372, filed on May 22, 2006.

(51) Int. Cl.
*H02M 7/5387* (2007.01)
(52) U.S. Cl. ..................................................... 363/132
(58) Field of Classification Search ................... 363/71, 363/131, 132, 159, 163
See application file for complete search history.

(56) References Cited

U.S. PATENT DOCUMENTS

| | | | | |
|---|---|---|---|---|
| 3,909,685 | A * | 9/1975 | Baker et al. | 318/139 |
| 5,892,677 | A * | 4/1999 | Chang | 363/152 |
| 5,909,367 | A * | 6/1999 | Change | 363/163 |
| 6,014,323 | A * | 1/2000 | Aiello et al. | 363/71 |
| 7,310,254 | B2 * | 12/2007 | Liu et al. | 363/163 |
| 2004/0022081 | A1 * | 2/2004 | Erickson et al. | 363/159 |
| 2007/0268728 | A1 * | 11/2007 | Mohan et al. | 363/132 |

OTHER PUBLICATIONS

A. Alesina et al., "Anaysis and Design of Optimum-Amplitude Nine-Switch Direct AC-AC Converters," IEEE Transactions on Power Electronics, vol. 4, No. 1, pp. 101-112, Jan. 1989.

A. Alesina et al., "Solid-State Power Conversion: A Fourier Analysis Approach to Generalized Transformer Synthesis," IEEE Transactions on Circuits and Systems, vol. CAS-28, No. 4, pp. 319-330, Apr. 1981.

D. Casadei et al., "A General Approach for the Analysis of the Input Power Quality in Matrix Converters," IEEE Transactions on Power Electronics, vol. 13, No. 5, pp. 882-891, Sep. 1998.

D. Casadei et al., "Reduction of the Input Current Harmonic Content in Matrix Converters Under Input/Output Unbalance," IEEE Transactions on Industrial Electronics, vol. 45, No. 3, pp. 401-411, Jun. 1998.

(Continued)

*Primary Examiner*—Adolf Berhane
*Assistant Examiner*—Yemane Mehari
(74) *Attorney, Agent, or Firm*—Shumaker & Sieffert, P.A.

(57) ABSTRACT

A matrix converter includes a plurality of switches that electrically connect a multi-phase input voltage source to a multi-phase load; and a controller to output pulse-width modulated (PWM) switching signals to control the switches to produce a multi-phase output voltage from the multi-phase input voltage source. The controller outputs the PWM switching signals by modulating a carrier signal with a time-varying signal having a frequency determined from a desired output frequency for the output voltage.

27 Claims, 28 Drawing Sheets

OTHER PUBLICATIONS

D. Vincenti et al., "A Generalized Approach for Input Unbalance Correction in Polyphase PWM Converters," Proceedings of the 1995 IEEE IECON, 21$^{st}$ International Conference on Industrial Electronics, Control, and Instrumentation, vol. 1 of 2, pp. 365-369.

D. Zhou et al., "Evaluation of Matrix Converter Operation in Abnormal Conditions," Proceedings of the Sixth International Conference on Electrical Machines and Systems, ICEMS2003, pp. 402-406, 2003.

J. Oyama et al., "New Control Strategy for Matrix Converter," Conference Record PESC '89 Record, 20$^{th}$ Annual IEEE Power Electronics Specialists Conference, pp. 361-367, Jun. 1989.

J. Rodriguez et al., "Multilevel Inverters: A Survey of Topologies, Controls and Applications," IEEE Transactions on Industrial Electronics, vol. 49, No. 4, pp. 724-738, Aug. 2002.

J.W. Kolar et al., "Novel Three-Phase AC-DC-AC Sparse Matrix Converter," Seventeenth Annual IEEE Applied Power Electronics Conference and Exposition, 2002, APEC '02, , vol. 2, pp. 777-791, Mar. 2002.

L. Helle, et al., "Evaluation of Modulation Schemes for Three-Phase to Three-Phase Matrix Converters," IEEE Transactions on Industrial Electronics, vol. 51, No. 1, pp. 158-171, Feb. 2004.

L. Huber et al., "Space Vector Modulated Three-Phase to Three-Phase Matrix Converter With Input Power Factor Correction," IEEE Transactions on Industry Applications, vol. 31, Issue 6, pp. 1234-1246, Nov./Dec. 1995.

K.K. Mohapatra et al., "A Novel Carrier Based PWM Scheme for Matrix Converters That Is Easy to Implement," Conference Record of PESC '05 pp. 2410-2414.

N. Mohan et al., "Explaining Synthesis of Three-Phase Sinusoidal Voltages Using SV-PWM in the First Power Electronics Course," IEEE, pp. 40-77, 2005.

P.D. Ziogas et al, "Some Improved Force Commutated Cycloconverter Structures," IEEE Transactions on Industry Appliations, vol. IA-21, No. 5, pp. 1242-1253, Sep./Oct. 1985.

Notification of Transmittal of the International Search Report and the Written Opinion of th International Searching Authority, or the the Declaration, from corresponding PCT Application Serial No. PCT/US2007/012216, mailed Dec. 14, 2007, 11 pages.

T. Satish et al., "Modulation Methods Based on a Novel Carrier-Based PWM Scheme for Matrix Converter Operation Under Unbalanced Input Voltages," Applied Power Electronics Conference and Exposition, 2006, pp. 127-132, Mar. 19, 2006.

J. Kang et al., "Common-Mode Voltage Characteristics of Matrix Converter-Driven AC Machines," Industry Applications Conference, 2005, Fourtieth IAS Annual Meeting, Conference Record of the 2005 Hong Kong, pp. 2382-2387, Oct. 2, 2005.

H. Cha et al., "An Approach to Reduce Common-Mode Voltage in Matrix Converter," IEEE Transactions on Industry Applications, vol. 39, No. 4, pp. 1151-1159 Jul./Aug. 2003.

O. Ojo et al., "Model for the Analysis and Control of Induction Motor Drives Fed with AC/AC Converters," Industry Applications Conference, Conference Record of the 2000 IEEE, vol. 4, pp. 2224-2230, Oct. 8, 2000.

Notification Concerning Transmittal of International Preliminary Report on Patentability from corresponding PCT Application Serial No. PCT/US2007/012216, mailed Dec. 11, 2008 (6 pages).

\* cited by examiner

US 7,869,236 B2

CARRIER-BASED PULSE-WIDTH MODULATION (PWM) CONTROL FOR MATRIX CONVERTERS

This application claims the benefit of U.S. Provisional Application Ser. No. 60/802,372, filed May 22, 2006, the entire content of which is incorporated herein by reference.

TECHNICAL FIELD

The invention relates to electrical converters and, in particular matrix converters.

BACKGROUND

When coupling a supply voltage source to a load, a converter is sometimes used to condition the input voltage (e.g., 3-phase AC voltage) to produce an output voltage having the desired frequency and amplitude. Examples of these converters include voltage-link and current-link converters. In conventional converters, the AC input voltage is first converted to DC, which is used to synthesize the AC output voltage of desirable frequency and amplitude. These conventional converters typically require large internal capacitance.

A recently developed type of converter is the matrix converter, which is a solid-state device. Matrix converters provide a direct link between the input voltage and the output voltage without any intermediate energy-storage element. For example, in matrix converters, the large, internal energy storage elements (i.e., capacitors) are avoided, and an output AC voltage of any desirable frequency can be obtained from an input AC voltage of any frequency by using nine bi-directional switches for 3-phase input and output voltages.

Compared to voltage-link and current-link converters, matrix converters can be much more susceptible to the input voltage disturbances.

SUMMARY

In general, a matrix converter is described that includes a plurality of switches that electrically connect a multi-phase input voltage source to a multi-phase load, and a controller to output pulse-width modulated (PWM) switching signals to control the switches to produce a multi-phase output voltage from the multi-phase input voltage source. The controller outputs the PWM switching signals by modulating a carrier signal with a time-varying signal having a frequency determined from a desired output frequency for the output voltage.

The control scheme described herein significantly simplifies the control scheme over conventional control schemes for matrix converters. For example, embodiments of the control scheme may avoid the requirements for any sector information and corresponding look-up tables to calculate the duty ratios. Moreover, the output voltage can be synthesized to its maximum capacity, a $\sqrt{3}/2$ times the amplitude of the input voltage. Like conventional schemes, this scheme also allows the input power factor to be controlled. Moreover, the control scheme can be applied to conditions where the input conditions and the load are not balanced.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
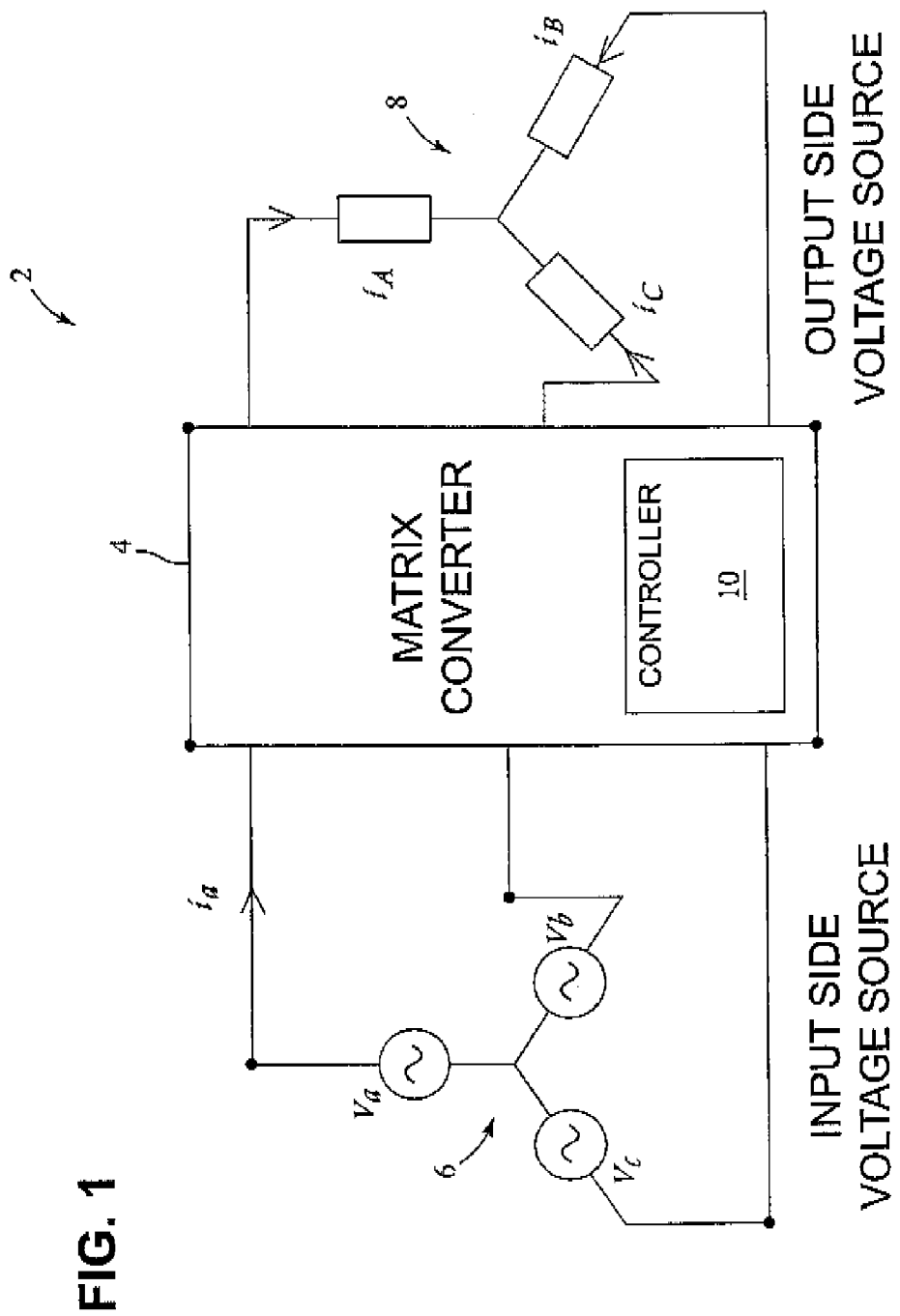
FIG. 1 is a block diagram of an electrical system in which a matrix converter enables any of three output phases of a load to be connected to any of three input phases of a power source.

FIG. 1 is a block diagram of an electrical system 2 in which a matrix converter 4 enables any of three output phases of a load 8 to be connected to any of three input phases of a power source 6. Matrix converter 4 includes a controller 10, which applies a pulse-width modulation scheme described herein for controlling matrix converter 4. In particular, based on specified desired phase, amplitude and frequency, controller 10 controls matrix converter 4 for generation of 3-phase AC output voltage for load 8 from 3-phase AC input voltage received from voltage source 6. Although described for exemplary purposes with respect to 3-phase input voltage and 3-phase output voltage, the techniques can readily be applied to electrical systems where either the voltage source or the load require 3 or more phases. As one example, the load may be a 5-phase, 7-phase and 9-phase hi-power motor. As one example, load 8 may be 3-phase induction motor of a windmill capable of generating two or three megawatts of electrical power.

Controller 10 may be integrated within load 8, e.g., integrated within a motor. Controller 10 may include a general-purpose processor, embedded processor, digital signal processor (DSP), microcontroller, field programmable gate array (FPGA), application specific integrated circuit (ASIC) or similar hardware, firmware and/or software for implementing the control techniques described herein.

If implemented in software, the invention may be embodied on a computer-readable storage medium, which may store computer readable instructions, i.e., program code, that can be executed by a processor or DSP to carry out one of more of the techniques described above. For example, the computer-readable storage medium may comprise random access memory (RAM), read-only memory (ROM), non-volatile random access memory (NVRAM), electrically erasable programmable read-only memory (EEPROM), flash memory, or the like.

Figure 2:
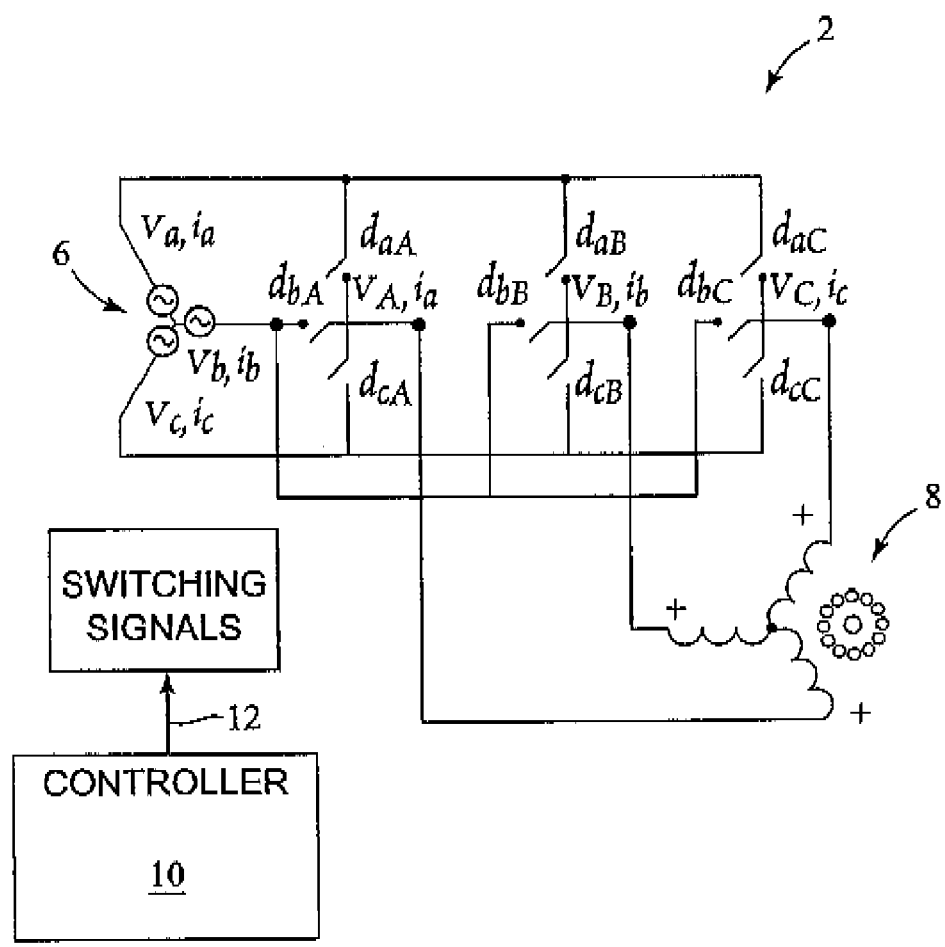
FIG. 2 is a schematic diagram of the electrical system in more detail.

FIG. 2 is a schematic diagram of electrical system 2 in more detail in which, for exemplary purposes, matrix converter 4 couples input-side voltage source 6 to a star connected 3-phase induction motor. In the example of FIG. 2, matrix converter 4 includes nine four-quadrant switches ($d_{aA}$, $d_{aB}$, $d_{aC}$, $d_{bA}$, $d_{bB}$, $d_{bC}$, $d_{cA}$, $d_{cB}$ and $d_{cC}$) that enable any of the three output phases of the input-side power source 6 to be connected to any of the three input phases. Controller 10 outputs controls signals 12 to electrically open and close the switches in accordance with the control scheme described herein. In particular, controller 10 opens and closes the switches according to a computed duty ratio for each switch (i.e., the length of time a given switch is closed), as determined using the control technique described herein. In this example, each four-quadrant switch can conduct in either direction when it is on (closed), and can block voltages in either direction when it is off (open). In one embodiment, controller 10 outputs controls signals 12 via a carrier-comparison based, pulse-width modulated (PWM) interface. Embodiments of the control scheme may avoid the requirements for any sector information and corresponding look-up tables to calculate the duty ratios.

In 3-level converters, the input dc voltage takes on one of the three dc values: $+V_d$, 0, $-V_d$. But in matrix converters, the input voltages are 3-phase AC. To synthesize the output voltage, for example for the output phase-A, the duty-ratios of the three switches for phase A in FIG. 2 are represented herein as dare $d_{aA}$, $d_{bA}$, and $d_{cA}$. Similarly, the duty-ratios defined for output phase B are represented as $d_{aB}$, $d_{bB}$, $d_{cB}$ and for output phase C are represented as $d_{aC}$, $d_{bC}$, $d_{cC}$. In one embodiment, controller 10 utilizes a switching time period of 50 µs, where the duty ratios for a given phase represent the time intervals for each of the switches during which the respective switch is closed.

Figure 3:
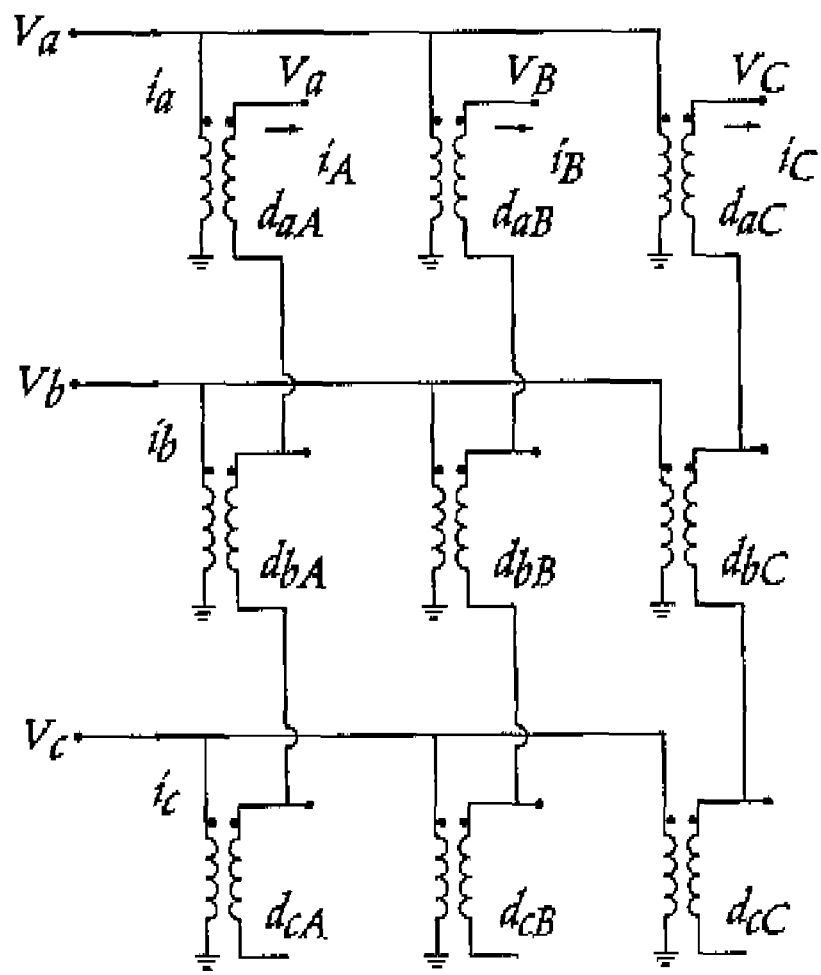
FIG. 3 is a schematic diagram illustrating that the voltages and currents for the matrix converter can be represented by nine ideal transformers.

The voltages V and currents i for the matrix converter 4 can be represented by nine ideal transformers, shown in FIG. 3. Each phase is represented as three ideal transformers connected in series.

The target frequency, phase and amplitude of the output voltage required by load 8 can be different from the characteristics of the input voltage. Thus, in developing the control scheme for matrix converter 4, an initial step is to eliminate the input frequency from the output voltage. The input voltages can be represented as:

$$v_a = \hat{V}\cos(\omega t), v_b = \hat{V}\cos(\omega t - 2\pi/3),$$

$$v_c = \hat{V}\cos(\omega t - 4\pi/3). \quad (1)$$

The output voltage, for example, for phase-A, B, C is synthesized by time-weighting the three input voltages by the duty ratios as follows:

$$v_A = d_{aA}v_a + d_{bA}v_b + d_{cA}v_c,$$

$$v_B = d_{aB}v_a + d_{dB}v_b + d_{cB}v_c, \text{ and}$$

$$v_C = d_{aC}v_a + d_{bC}v_b + d_{cC}v_c. \quad (2)$$

The duty ratios should be so chosen that the output voltage remains independent of input frequency. In other words, the three-phase balanced input voltages can be considered to be in stationary reference frame and the output voltage can be considered to be in synchronous reference frame, so that input frequency term will be absent in the output voltage, which may be viewed as a virtual DC link. Hence the duty ratios $d_{aA}$, $d_{bA}$, and $d_{cA}$ are chosen to be $k_A \cos(\omega t - 2\pi/3 - \rho)$, and $k_A \cos(\omega t - 4\pi/3 - \rho)$ in Eq. 2, $$v_A = k_A \hat{V}[\cos(\omega t) \cdot \cos(\omega t - \rho) + \quad (3)$$
$$\cos(\omega t - 2\pi/3) \cdot \cos(\omega t - 2\pi/3 - \rho) +$$
$$\cos(\omega t - 4\pi/3) \cdot \cos(\omega t - 4\pi/3 - \rho).$$

Eq. 3 simplifies as follows:

$$v_A = \frac{3}{2} k_A \hat{V} \cos(\rho) \quad (4)$$

In eqn. 4 $\cos(\rho)$ term represents that the output voltage is affected by the choice of $\rho$ and later it will be explained that the input power factor depends on $\rho$. Eq. 4 shows that the output voltage $v_A$ is independent of the input frequency and only depends on the amplitude $\hat{V}$ of the input voltage where the modulation index $k_A$ is a time-varying signal with the desired output frequency $\omega_o$ for modulating the carrier signal used to generate the PWM switching signals:

$$w_A = k\cos(\omega_o t), k_B = k\cos(\omega_o t - 2\pi/3),$$

$$k_C = k\cos(\omega_o t - 4\pi/3), \quad (5)$$

where $k_B$ and $k_C$ are the modulation indices for the output phases B an C respectively. That is, controller 10 produces switching signals 12 by modulating a carrier signal with a time-varying signal $k_A$ having a frequency equal to the desired output frequency $\omega_o$ for the output voltage.

Therefore, from Eq. 4, the output voltage in phase-A is $$v_A = \left(\frac{3}{2}k\hat{V}\cos(\rho)\right)\cos(\omega_o t) \quad (6)$$

In the discussion above, duty-ratios become negative (i.e., negative in time) which is not practically realizable. At any instant the condition "0<(duty ratio of the switch) 21 1" should be valid. Therefore, offset duty-ratios need to be added to the existing duty ratios, so that the net resultant duty-ratios of individual switches are always positive. Furthermore, the offset duty-ratios should be added equally to all the output phases to ensure that the resultant output voltage vector produced by the offset duty-ratios is null in the load. That is, the offset duty-ratios can only add the common-mode voltages in the output.

Considering the case of output phase-A $$\begin{aligned} d_{aA} + d_{bA} + d_{cA} &= k_A\cos(\omega t - \rho) + \\ &\quad k_A\cos(\omega t - 2\pi/3 - \rho) + \\ &\quad k_A\cos(\omega t - 4\pi/3 - \rho) \\ &= 0. \end{aligned} \quad (7)$$

To cancel the negative components from individual duty ratios absolute value of the duty ratios are added. Thus, the minimum individual offset duty ratios should be $$D_a(t) = |k_A\cos(\omega t - \rho)|,$$

$$D_b(t) = |k_A\cos(\omega t - 2\pi/3 - \rho)|, \text{ and}$$

$$D_c(t) = |k_A\cos(\omega t - 4\pi/3 - \rho)|, \text{ respectively.} \quad (8)$$

Figure 4:
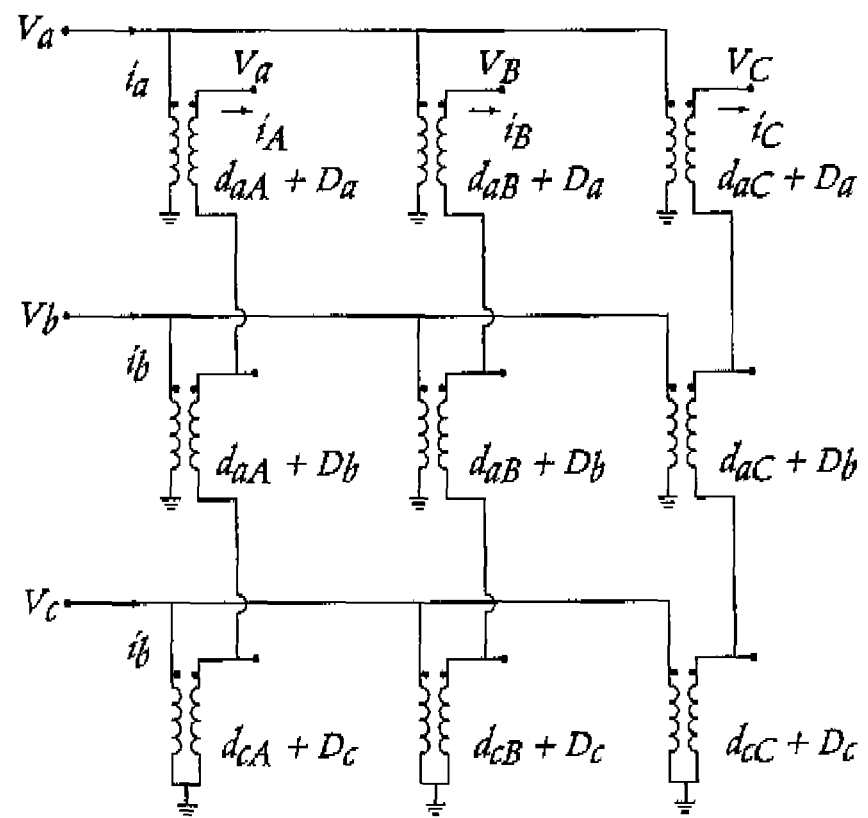
FIG. 4 is a schematic diagram showing the representation of the matrix converter of FIG. 3 in which common mode offsets have been added to the duty ratios of each phase, respectively.

Thus, the new net duty ratios are $da_{aA} + D_a(t)$, $d_{bA} + D_b(t)$ and $d_{cA} + D_c(t)$. The case of input phase-a is taken as example. The same holds good for phase-b and c. The net duty ratio $d_{aA} + D_a(t)$ should be accommodated within a range of 0 to 1. FIG. 4 shows the representation of matrix converter 4 of FIG. 3 in which common mode offsets $D_a$, $D_b$ and $D_c$ have been added to the duty ratios of each phase, respectively.

Thus Therefore, $0 < d_{aA} + D_a(t) < 1$, i.e. $0 < k_A\cos(\omega t - \rho) + |k_A\cos(\omega t - \rho)| < 1$. This implies that in the worst case $0 < 2|k_A| < 1$, i.e. the maximum value of $|k_A|$ or in other words k in eqn. 5 is equal to 0.5. Hence the offset duty-ratios corresponding to the three input phases are chosen as:

$$D_a(t) = |0.5\cos(\omega t - \rho)|,$$

$$D_b(t) = |0.5\cos(\omega t - 2\pi/3 - \rho)|, \text{ and}$$

$$D_b(t) = |0.5\cos(\omega t - 4\pi/3 - \rho)|. \quad (9)$$

Thus, the modified duty ratios for output phase-A are:

$$D_{aA} = D_a(t) + k_A\cos(\omega t - \rho),$$

$$D_{bA} = D_b(t) + k_A\cos(\omega t - 2\pi/3 - \rho), \text{ and}$$

$$D_{cA} = D_c(t) + k_A\cos(\omega t - 4\pi/3 - \rho) \quad (10).$$

If $k_A$, $k_B$ and $k_C$ are chosen to be 3-phase sinusoidal references as given in Eq. 5, the input voltage capability is not fully utilized for output voltage generation. To utilize this capability to the fullest, an additional common mode term equal to $[-\{\max(k_A, k_B, k_C) + \min(k_A, k_B, k_C)\}/2]$ is added according to the traditional space vector PWM principle as implemented in two-level inverters. Thus, the amplitude of $k_A$, $k_B$ and $k_C$ can be enhanced from 0.5 to 0.57.

Thus, the new modulation indices for output phase-A are modified as $$d_{aA} = D_a(t) + [k_A - \{\max(k_A, k_B, k_C) + \quad (11)$$

$$\min(k_A, k_B, k_C)\}/2] \times \cos(\omega t - \rho),$$

$$d_{bA} = D_b(t) + [k_A - \{\max(k_A, k_b, k_C) +$$

$$\min(k_A, k_B, k_C)\}/2] \times \cos(\omega t - 2\pi/3 - \rho),$$

and $$d_{cA} = D_c(t) + [k_A - \{\max(k_A, k_b, k_C) +$$

$$\min(k_A, k_B, k_C)\}/2] \times \cos(\omega t - 4\pi/3 - \rho).$$

Figure 5:
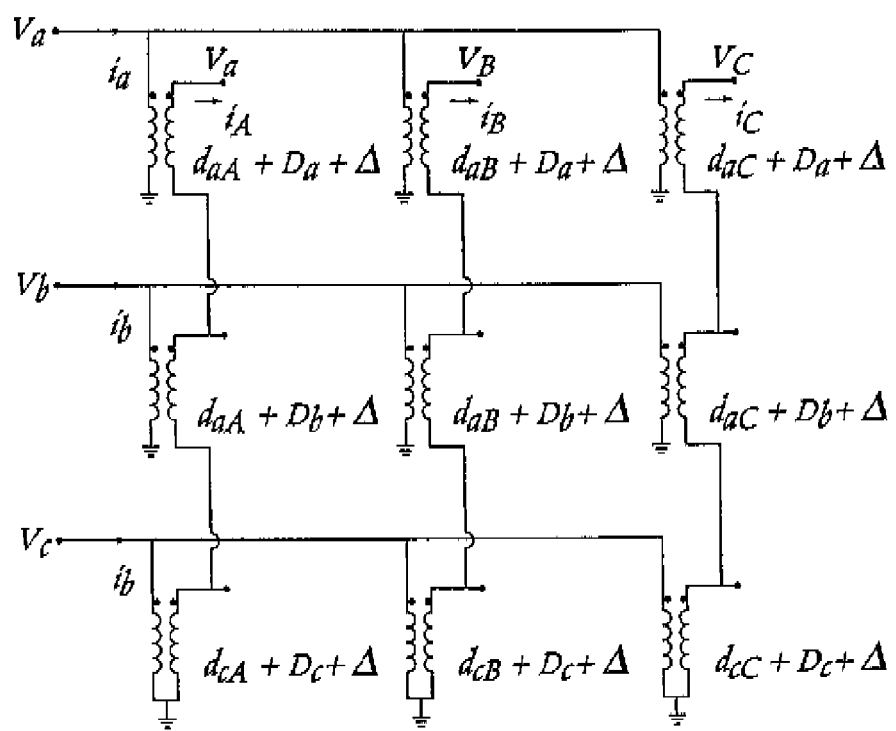
FIG. 5 is a schematic diagram illustrating that the addition of the common-mode duty-ratio offset in all switches for all phases will maintain the output voltages and input currents unaffected.
Figure 6A:
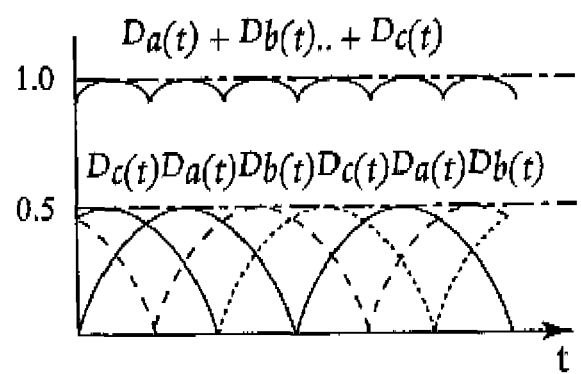
FIG. 6A is a graph illustrating that the summation of offset-duty ratios $\{D_a(t)+D_b(t)+D_c(t)\}$ is less than or equal to unity.

In any switching cycle the output phase has to be connected to any of the input phases. The summation of the duty ratios in Eq. 11 must equal unity. But the summation $\{D_a(t) + D_b(t) + D_c(t)\}$ is less than or equal to unity as shown in FIG. 6A. Hence, another common-mode voltage duty-ratio $\Delta$ of $$\frac{1 - \{D_a(t) + D_b(t) + D_c(t)\}}{3}$$

is added to $D_a(t)$, $D_b(t)$, and $D_c(t)$ in Eq. 11. The addition of the common-mode duty-ratio offset $\Delta$ in all switches for all phases (as shown in FIG. 5) will maintain the output voltages and input currents unaffected. Similarly, the duty ratios are calculated for the output phases B and C.

To calculate the input power factor, the input current in a phase is represented as a function of the duty ratios and the output currents. Thus, considering the input phase-a in FIG. 2, thin input currents are synthesized by time-weighting the output currents by the duty-ratios as shown in Eq. 3 and are given as:

$$i_a = d_{aA}i_A + d_{aB}i_B + d_{aC}i_C,$$

$$i_b = d_{bA}i_A + d_{bB}i_B + d_{bC}i_C, \text{ and}$$

$$i_c = d_{cA}i_A + d_{cB}i_B + d_{cC}i_C. \quad (12)$$

Considering the case of input phase-a as an example the common-mode terms present in $d_{aD}$, $d_{aB}$, and $d_{aC}$ will not produce any current in the input. Because $i_a$, $i_B$, $i_C$ are balanced three phase currents, the common mode term will produce null current in the input i.e.

(The common mode term) $\times (i_A, i_B, i_C) = 0. \quad (13)$

Hence $$i_a = (k_A i_A + k_B i_B + k_C i_C)\cos(\omega t - \rho). \quad (14)$$

Since $k_A$, $k_B$, $k_C$, and $i_A$, $i_B$, $i_C$ are three-phase sinusoidal quantities at the output frequency, $k_A i_A + k_B i_B + k_C i_C$ in Eq. 15 equals a constant.

$$k_A i_A + k_B i_B + k_C i_C = \frac{3}{2}k I_o \cos\phi_a, \quad (15)$$

where k is the amplitude of the modulation indices $k_A$, $k_B$, and $k_C$ in Eq. 5, $I_a$ is the amplitude of the output currents and $\phi_a$ is the output power factor angle. Using Eq. 15 into Eq. 14, the input current $i_a$ is in a lagging phase of $\rho$ with the input voltage $v_a$. To have a unity power factor operation p has to be chosen equal to zero.

Switching signals corresponding to the output phase-A can be obtained by comparing switching signals with a triangular carrier like in most PWM ac drives. Thus if the amplitude of the carrier is one, then two references $d_{aA}$ and $d_{aA}+d_{bA}$ are compared with the carrier for generation of the PWM switching signals 12, shown as $q_{cA}$, $q_{bA}$ and $q_{aA}$ if one phase in FIG. 6B.

A procedure for controlling convention, converter-driven motor drives. Controller 10 may generate switching signals 12 for the switches by comparing three control voltages (shown as horizontal dashed lines in FIG. 6B) with a triangular wave form between 0 and 1. Based on the comparison, output the appropriate switching signals q to close the respective switches for a given phase according to the shown duty ratios. For three-phases, three such comparisons are used to generate three sets of switching signals for the switches.

Simulation and Experimental Results

Figure 7:
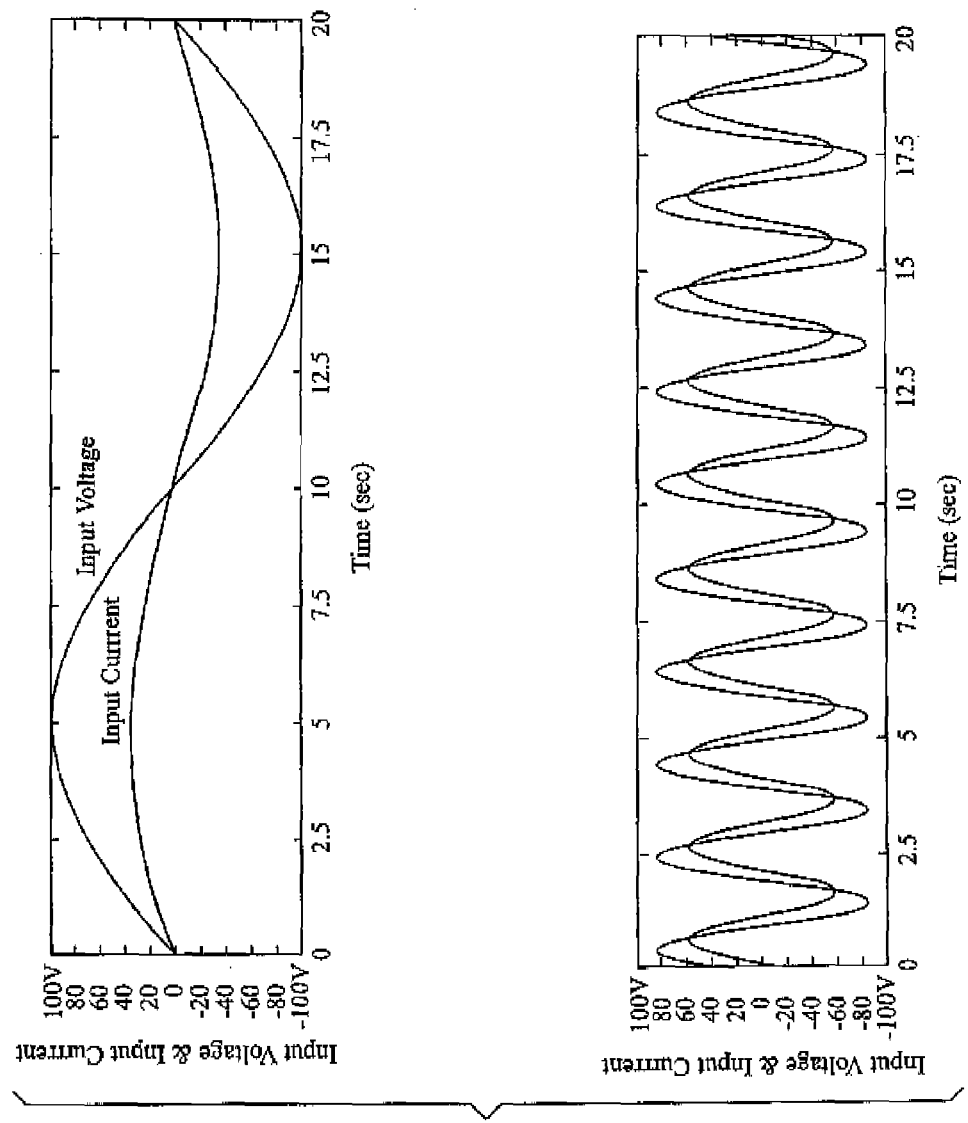
FIG. 7 includes two graphs illustrating simulated results for input side and output side quantities.

The simulated results for input side and output side quantities are shown in FIG. 7. These figures show a unity power factor of operation at the input, independent of the output frequency and power factor.

The output voltage capability is at the theoretical limit of matrix converters. Because the switches are fourth quadrant types, the converter is suitable for regenerative mode of operation.

Figure 6B:
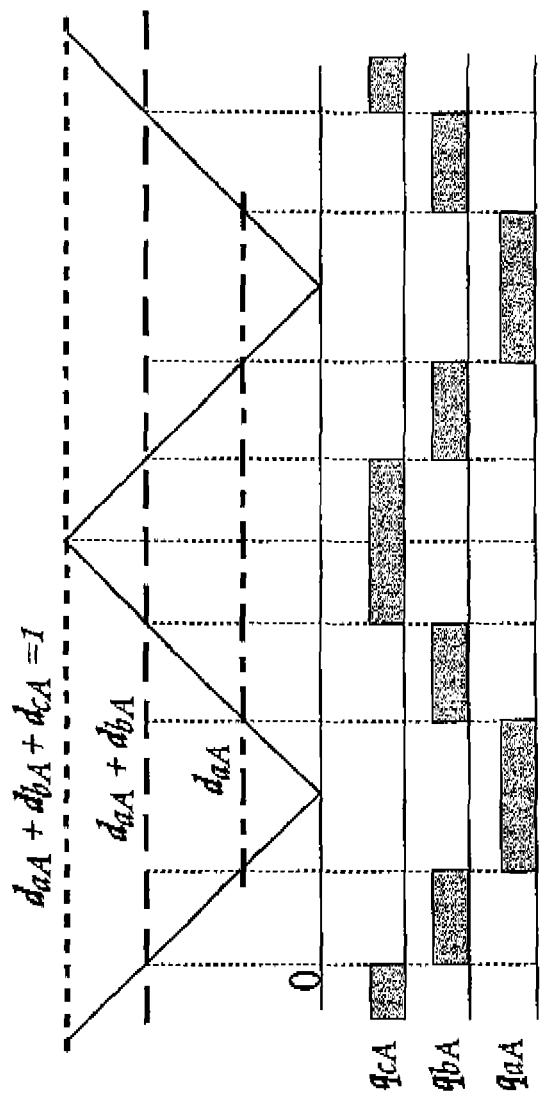
FIG. 6B is a conceptual diagram illustrating the logic for a 3-level PWM generation for phase A.

Experimental results from a matrix converter laboratory prototype are presented in FIGS. 8-11. The matrix converter was controlled by a TMS320240 based DSPACE board. The logic for a 3-level PWM generation for phase A is shown in FIG. 6B.

A 1.5KW R-L load was used in delta configuration in the matrix converter output. The matrix converter was operated with a input line to line voltage of 210V, 60 Hz.

Figure 8:
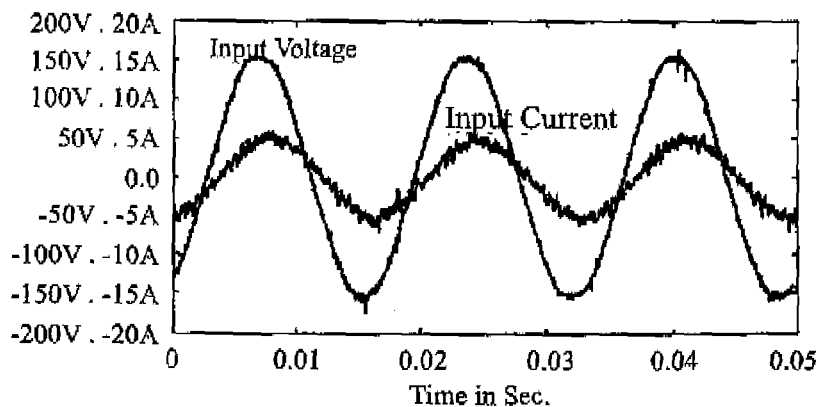
FIGS. 8-11 are graphs illustrating experimental results from a matrix converter laboratory prototype.
Figure 9:
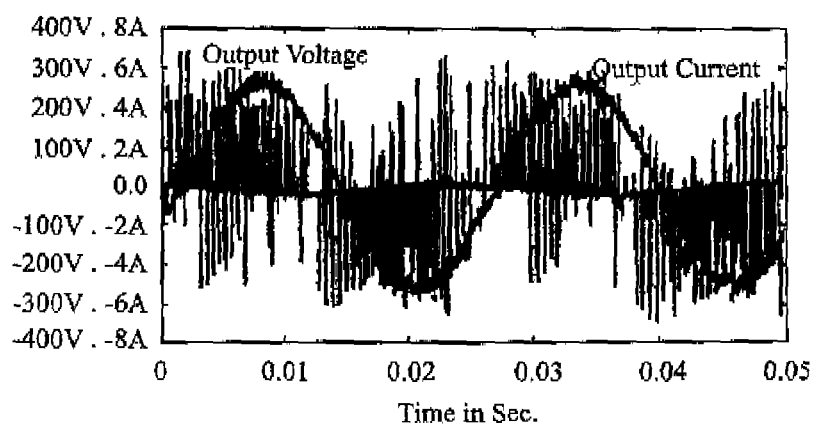

Two sets of results are taken. One set of results corresponds to output frequency of 40 Hz, which is less than the input frequency of 60 Hz and another set of results corresponds to output frequency of 80 Hz which is more than the input frequency. The corresponding input phase voltage and phase current are shown in FIG. 9 which are of 40 Hz in frequency. The corresponding input phase voltage and phase current are shown in FIG. 8, which confirms that the input power factor is unity. The minor lag in the input is due to the filter inductance.

Figure 10:
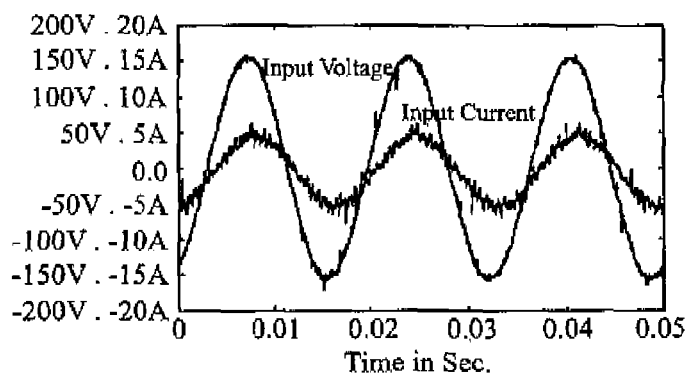
Figure 11:
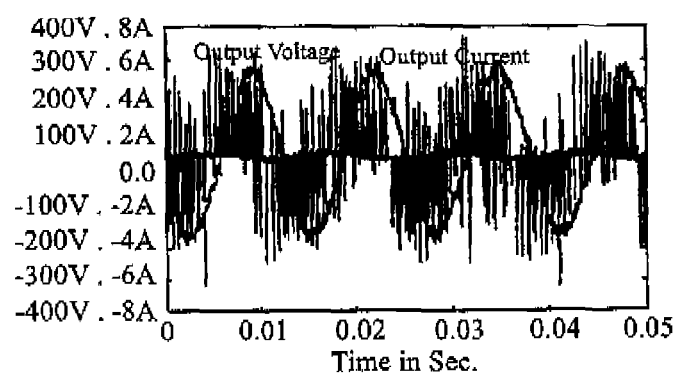

Similarly, FIGS. 10 and 11 show the results for an output frequency of 80 Hz. Both the results show that the input power factor and frequency is independent of output power factor and frequency. This low-voltage low-power laboratory prototype confirms the proposed modulation scheme for the matrix converters and it shows that both frequency and power factor in the input side and output side are independent of each other.

In the discussion above, a 3-phase to 3-phase example matrix converter is explained from the point of view of multi-level inverter topology, and a novel modulation scheme is proposed where the need for sector information and corresponding look-up tables are avoided. In one embodiment, the output voltage is synthesized to its maximum capacity, $\sqrt{3}/2$ times the amplitude of the input voltage, as in all matrix converter modulation schemes described previously. The proposed scheme allows the input power factor to be controlled.

The theoretical analysis of the proposed modulation scheme is confirmed by simulations and a hardware prototype in the laboratory.

Matrix Converter Under Unbalanced Input

As explained above, a matrix converter can be drawn as a three-level converter. Based on the switch duty-ratios, the switching-cycle-average output voltages and the input currents can be related to the input voltages and the output currents, respectively as:

$$\begin{bmatrix} v_A \\ v_B \\ v_C \end{bmatrix} = \begin{bmatrix} d_{aA} & d_{bA} & d_{cA} \\ d_{aB} & d_{bB} & d_{cB} \\ d_{aC} & d_{bC} & d_{cC} \end{bmatrix} \begin{bmatrix} v_a \\ v_b \\ v_c \end{bmatrix} \quad (1a)$$

$$\begin{bmatrix} i_a \\ i_b \\ i_c \end{bmatrix} = \begin{bmatrix} d_{aA} & d_{aB} & d_{aC} \\ d_{bA} & d_{bB} & d_{bC} \\ d_{cA} & d_{cB} & d_{cC} \end{bmatrix} \begin{bmatrix} i_A \\ i_B \\ i_C \end{bmatrix}$$

Figure 12:
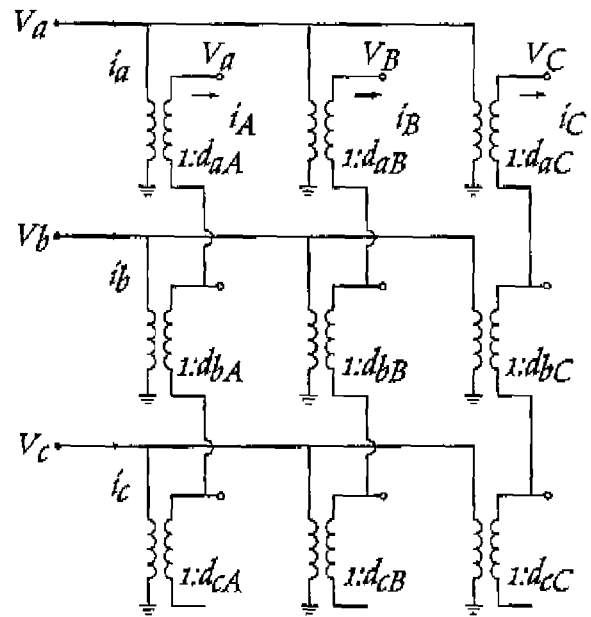
FIG. 12 is a schematic diagram illustrating that a matrix converter on a switching-cycle averaged basis can be represented by nine ideal transformers with varying turns-ratios.
Figure 13:
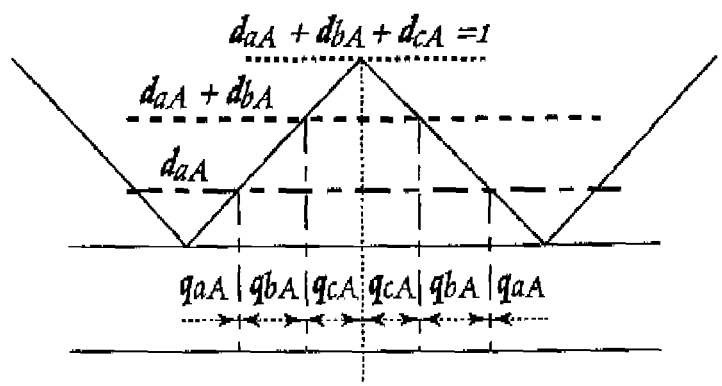
FIG. 13 is a conceptual diagram illustrating PWM switching signals.

Based on these relationships in (1a), as discussed above, a matrix converter on a switching-cycle averaged basis can be represented by nine ideal transformers with varying turns-ratios, as shown in FIG. 12. The duty-ratios calculated using appropriate common-mode voltages, are used to obtain PWM switching signals using carrier-comparison, as shown in FIG. 13, for phase-A.

The novel carrier-based PWM approach can be extended to allow obtaining balanced output voltages with unbalanced inputs. Three such methods are described below and their results have been compared. The method that results in least harmonics, although based on dynamic modulation of the instantaneous voltage space vector rotating at the input frequency in the synchronously-rotating reference-frame, is also implemented using carrier-based PWM.

Neglecting the switching losses, the power at the input current port is equal to the power at the output voltage port. Thus, the individual switches in the converter are modulated so as to keep the instantaneous input power equal to that of the output. Under balanced input voltages, balanced 3-phase voltages at the output can be obtained while ensuring sinusoidal input currents. However, when there is an unbalance in the input voltages, one has to compromise balancing and/or the sinusoidal nature, either in the input-side currents or in the output-side voltages, so as to satisfy the power transfer condition. In the discussion to follow, three control methods are described that result in balanced sinusoidal output voltages under unbalanced input voltages. Methods 2 and 3 result in non-sinusoidal currents in the input, thus containing harmonics, while in method 1 the input currents are sinusoidal but are unbalanced.

Any unbalanced set of three phase voltages can be represented as the sum of positive and negative sequence components.

$$v_{a_P} = \hat{V}_P \cos(\omega_i t + \phi_P), v_{a_N} = \hat{V}_N \cos(\omega_i t + \phi_N) \quad (2a)$$

$$v_{b_P} = \hat{V}_P \cos(\omega_i t - 2\pi/3 + \phi_P),$$

$$b_{b_N} = \hat{V}_N \cos(\omega_i t - 2\pi/3 + \phi_N) \quad (3a)$$

$$v_{c_P} = \hat{V}_P \cos(\omega_i t - 2\pi/3 + \phi_P),$$

$$v_{c_N} = \hat{V}_N \cos(\omega_i t - 2\pi/3 + \phi_N) \quad (4a)$$

Thus $v_a = v_{a_P}$, $v_b = v_{b_P} + v_{b_{dN}}$ and $v_c = v_{c_P} + v_{c_N}$, where $(\hat{V}_P, \phi_P)$ and $(\hat{V}_N, \phi_N)$ are the amplitude and phase of the positive and negative sequence voltages respectively. The zero sequence voltages are absent in a three wire system.

Method-I

The modulation indices for the switches corresponding to any output phase in this method are generated from the positive and negative sequence components of the input voltage. Because the input voltage has both positive and negative sequence components, the corresponding duty ratios should have positive and negative sequence components in proper ratio in order to make the output voltages balanced. Considering the case of output phase-A for analysis, the duty ratios are shown in (5a) as positive and negative sequence components.

$$d_{aA}=d_{aA_\rho}+d_{aA_N}, d_{bA}=d_{bA_\rho}+d_{bA_N} \text{ and } d_{cA}=d_{cA_\rho}+d_{cA_N},$$

where $$d_{aA_\rho}=k_{a_\rho}\cos(\omega_i t+\phi_\rho+\rho_\rho),$$

$$d_{aA_N}=k_{A_N}\cos(\omega_i t+\phi_N+\rho_N) \quad (6a)$$

$$d_{bA_\rho}=k_{a_\rho}\cos(\omega_i t-2\pi/3+\phi_\rho+\rho_\rho),$$

$$d_{bA_N}=k_{A_N}\cos(\omega_i t+2\pi/3+\phi_N+\rho_N) \quad (7a)$$

$$d_{cA_\rho}=k_{a_{\rho\rho}}\cos(\omega_i t+2\pi/3+\phi_\rho+\rho_\rho),$$

$$d_{cA_N}=k_{a_N}\cos(\omega_i t-2\pi/3+\phi_N+\rho_N) \quad (8a)$$

Hence output voltage for phase-A from (1a) results in $$v_A = \frac{3}{2}\{\hat{V}_\rho k_{A_\rho}\cos(\rho_\rho) + \hat{V}_N K_{A_N}\cos(\rho_N) + \hat{V}_N k_{A_\rho}\cos(2\omega_i t) + \phi_\rho + \phi_N + \rho_\rho + \hat{V}_\rho k_{A_N}\cos(2\omega_i t + \phi_\rho + \phi_N + \rho_N)\}. \quad (9a)$$

The harmonic frequency term from (9a), is shown in (10a), $$\hat{V}_N k_{A_\rho}\cos(2\omega_i t+\phi_\rho+\phi_N+\rho_\rho)+ \quad (10a)$$

$$\hat{V}_N k_{A_\rho}\cos(2\omega_i t+\phi_\rho+\phi_N+\rho_N)$$

This term and hence its effect on the output voltage can be nullified by selecting the positive and negative sequence components of the modulation according to (11a)

$$\Rightarrow k_{A_\rho}=k\hat{V}_\rho, k_{a_N}=k\hat{V}_N \text{ and } \rho_\rho=\rho_N+\pi, \quad (11a)$$

where 'k' is proportional to the instantaneous modulation index of the output phase-A. Similar equations can be derived for the other two phases. Also the maximum and minimum limits of 'k' are given as $-0.5/(\hat{V}_\rho+\hat{V}_N)\leq k\leq 0.5/(\hat{V}_\rho+\hat{V}_N)$. Thus the range of variation of phase-A voltage can be calculated as in (12a)

$$-\frac{3}{4}(\hat{V}_\rho - \hat{V}_N) \leq \hat{V}_A \leq \frac{3}{4}(\hat{V}_\rho - \hat{V}_N) \quad (12a)$$

Thus, the output voltage in case of unbalanced input voltage is less compared to the same in case of balanced input voltage by a factor $(\hat{V}_\rho-\hat{V}_N)/(\hat{V}_\rho+\hat{V}_N)$.

In order to compensate for the unrealizable negative duty ratios, the offset duty ratios shown in (13-15) are added.

$$D_A = \left|\frac{0.5\hat{V}_\rho}{\hat{V}_\rho + \hat{V}_N}\cos(\omega_i t + \phi_\rho + \rho_\rho)\right| + \left|\frac{0.5\hat{V}_N}{\hat{V}_\rho + \hat{V}_N}\cos(\omega_i t + \phi_N + \rho_\rho)\right| \quad (13a)$$

$$D_B = \left|\frac{0.5\hat{V}_\rho}{\hat{V}_\rho + \hat{V}_N}\cos(\omega_i t - 2\pi/3 + \phi_\rho + \rho_\rho)\right| + \left|\frac{0.5\hat{V}_N}{\hat{V}_\rho + \hat{V}_N}\cos(\omega_i t - 2\pi/3 + \phi_N + \rho_\rho)\right| \quad (14a)$$

$$D_C = \left|\frac{0.5V_\rho}{\hat{V}_\rho + \hat{V}_N}\cos(\omega t + 2\pi/3 + \phi_\rho + \rho_\rho)\right| + \left|\frac{0.5v\hat{V}_N}{\hat{V}_\rho + \hat{V}_N}\cos(\omega t - 2\pi/3 + \phi_N + \rho_\rho)\right|. \quad (15a)$$

These offset duty ratios are the same for all out phases and appear as common mode terms. To make the sum of duty ratios in a switching period equal to one, another offset duty ratio equal to $\{1-(D_A+D_B+D_C)\}/3$ is added to the individual duty ratios. The modulation indices ($k_{A_\rho}$, $k_{B_\rho}$, $k_{C_\rho}$) and ($k_{a_N}$, $k_{b_N}$, $k_{C_N}$) are chosen so as to achieve the desired magnitude and frequency of the output voltages while satisfying the conditions in (11a).

Method-II

Figure 14:
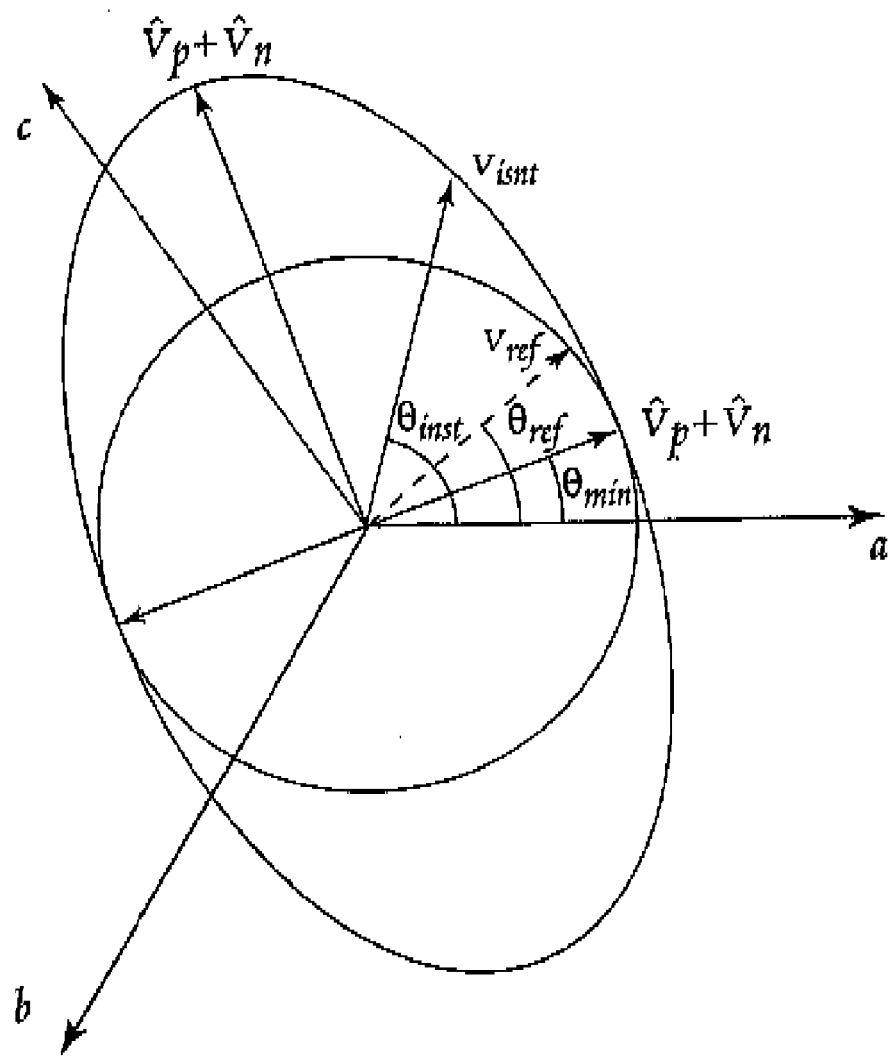
FIG. 14 is a conceptual diagram illustrating the resultant voltage-vector rotating in an elliptical trajectory.

Using three-phase to stationary two-phase transformation, the unbalanced input voltages result in the tip of the resultant voltage-vector rotating in an elliptical trajectory as shown in FIG. 14. The instantaneous amplitude and the phase of the resultant vector are as follows:

$$V_{inst} = \sqrt{\hat{V}_\rho^2 + \hat{V}_N^2 + 2\hat{V}_\rho\hat{V}_N\cos(2\omega_i t + \phi_\rho + \phi_N)} \quad (16a)$$

$$\theta_{inst} = \tan^{-1}\frac{(\hat{V}_\rho\sin(\omega t + \phi_\rho) - \hat{V}_N\sin(\omega t + \phi_N))}{(\hat{V}_\rho\cos(\omega t + \phi_\rho) + \hat{V}_N\cos(\omega t + \phi_N))} \quad (17a)$$

The instantaneous modulation indices in this method are calculated based on the amplitudes of the resultant and reference voltage vectors. The amplitude of the reference voltage vector is $(\hat{V}_\rho-\hat{V}_N)$, which is equal to the amplitude of the minor axis of the ellipse. The vectors shown as dotted lines in FIG. 14. Hence the maximum amplitude of the modulation index at any instant to make the output voltage balanced is $$\frac{(\hat{V}_\rho - \hat{V}_N)}{V_{inst}}.$$

Taking the case of output phase-A, the duty-ratios for the switches corresponding to input phase-a, b, c are chosen as follows, where ρ is the desired input power-factor:

$$d_{aA} = k_A \frac{v_a}{V_{inst}}\cos(\omega_{iu}t + \rho) \quad (18a)$$

-continued $$d_{bA} = k_A \frac{v_b}{V_{inst}} \cos(\omega_{iu} t - 2\pi/3 + \rho)$$

$$d_{cA} = k_A \frac{v_c}{V_{inst}} \cos(\omega_{iu} t + 2\pi/3 + \rho)$$

The instantaneous voltage vector magnitude can be obtained by stationary transforming the input three phase voltages. To compensate for the negative duty ratios, offset duty ratios shown in (19a), which appear as common-mode terms in the output, are added to the duty ratios in (18a).

$$D_A = \left|0.5 \frac{v_a}{V_{inst}} \cos(\omega_i t + \rho)\right| \quad (19a)$$

$$D_B = \left|0.5 \frac{v_b}{V_{inst}} \cos(\omega_i t - 2\pi/3 + \rho)\right|$$

$$D_C = \left|0.5 \frac{v_c}{V_{inst}} \cos(\omega_i t + 2\pi/3 + \rho)\right|$$

The modulation indices $k_A$, $k_B$ and $k_C$ are given as follows, where $$k = k \frac{(\hat{V}_\rho - \hat{V}_N)}{V_{inst}}$$

and $0 \leq k \leq 0.5$:

$$k_A = k' \cos \omega_o t, \; k_B = k' \cos(\omega_o t - 2\pi/3) \text{ and}$$

$$k_C = k' \cos(\omega_o t - 4\pi/3) \quad (20a)$$

The maximum value of k can be increased from 0.5 to 0.57.

Method-III

The instantaneous modulation indices are calculated based on both the amplitude and the phase of the resultant and reference voltage vectors. The amplitude of the reference voltage vector is $(\hat{V}_\rho - \hat{V}_N)$, which is equal to the amplitude of the minor axis of the ellipse and rotates at an angular speed reference vector $(\theta_{ref})$ at any instant is the same as $(\omega_i t + \phi_\rho)$ of the positive-sequence input voltage. The vectors are shown as dotted lines in FIG. 14. Hence the maximum amplitude of the modulation index at any instant to make the output voltage balanced is $$\frac{(\hat{V}_\rho - \hat{V}_N)}{V_{inst} \cos(\theta_{inst} - \theta_{ref})}.$$

Taking the case of the output phase-A, the duty-ratios for the switches corresponding to input phase-a, b, c are chosen as follows, where $\rho$ is the desired input power-factor:

$$d_{aA} = k_A \cos(\theta_{ref} + \rho)$$

$$d_{bA} = k_A \cos(\theta_{ref} - 2\pi/3 + \rho) \quad (21a)$$

$$d_{cA} = k_A \cos(\theta_{ref} + 2\pi/3 + \rho)$$

To compensate for the negative duty ratios, the offset duty ratios shown in (22a), which appear as common-mode terms in the output, are added to the duty ratios in (21a).

$$D_A = |0.5 \cos(\theta_{ref} + \rho)|$$

$$D_B = |0.5 \cos(\theta_{ref} - 2\pi/3 + \rho)| \quad (22a)$$

$$D_C = |0.5 \cos(\theta_{ref} + 2\pi/3 + \rho)|$$

The modulation indices $k_A$, $k_B$ and $k_C$ are given as follows, $$\text{where } k' = \frac{(\hat{V}_\rho - \hat{V}_N)}{V_{inst} \cos(\theta_{inst} - \theta_{ref})} \text{ and } 0 \leq k \leq 0.5: \quad (23a)$$

$$k_A = k' \cos \omega_o t, \; k_B = k' \cos(\omega_o t - 2\pi/3) \text{ and}$$

$$k_C = k' \cos(\omega_o t - 4\pi/3)$$

Similar to that in Method-II, the maximum value of k can be increased from 0.5 to 0.57.

EXPERIMENTAL RESULTS

The three different methods described above were verified by both simulations and experiments. The experiment was carried out using a 1.5 kW matrix converter, where the PWM signals for the converter were generated from DSPACE (DS 1103 Real-time system) and an FPGA (Spartan-II) interface board was used to properly synchronize and route the switching signals to the matrix converter. The experiment with unbalanced input voltages was carried out with 15% unbalance with the input peak-peak voltages in phases a, b, c being 125V, 110V 95V respectively. The resulting output voltages and the input currents in the three phases are presented below for the different modulation methods.

Figure 15A:
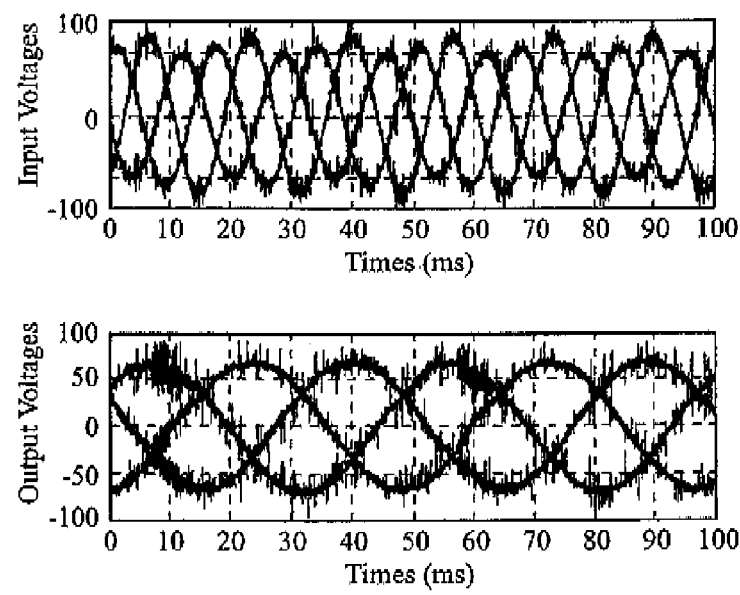
FIG. 15A includes two graphs illustrating input and the output voltages.
Figure 16A:
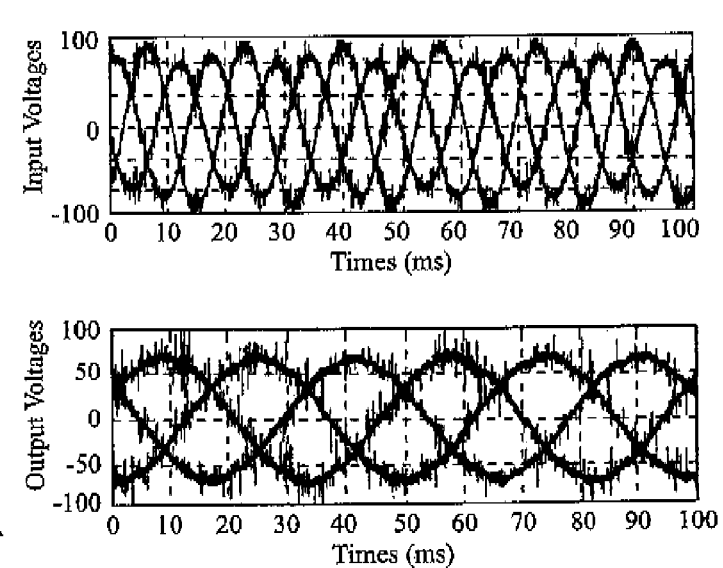
FIG. 16A includes two graphs illustrating input and the output voltages.
Figure 16B:
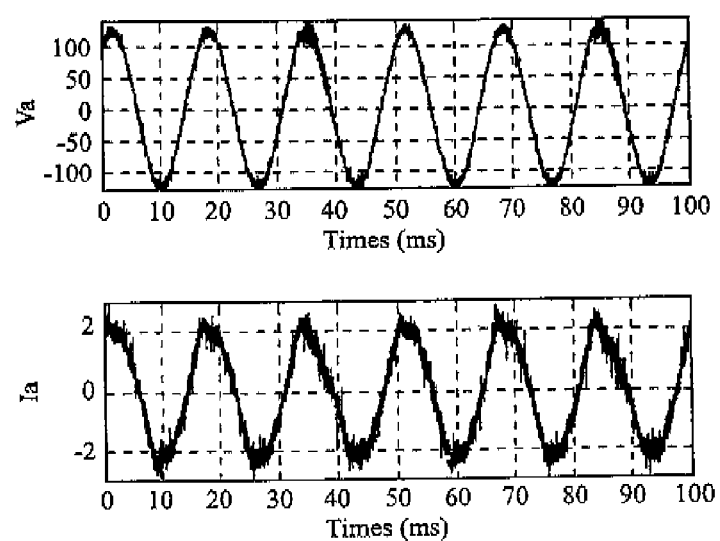
FIGS. 16B-16D are graphs illustrating input line currents.
Figure 16C:
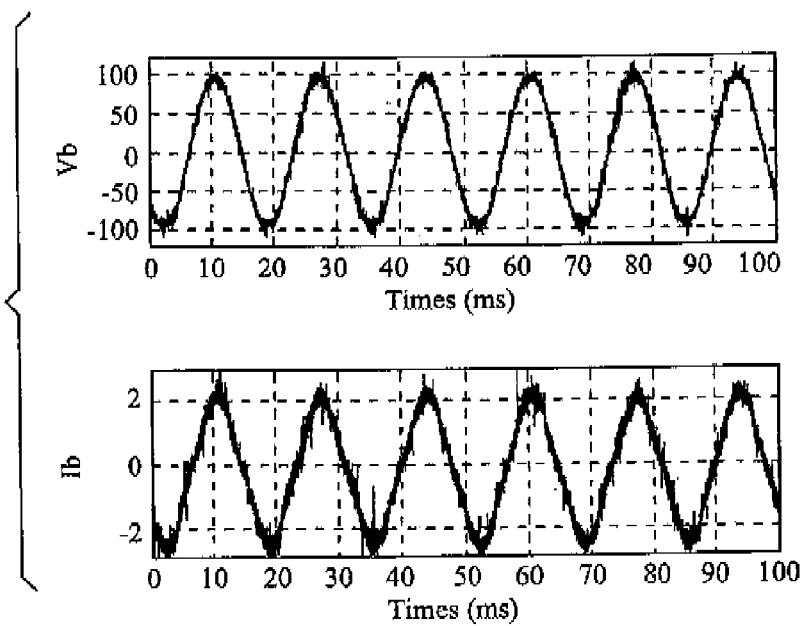
Figure 16D:
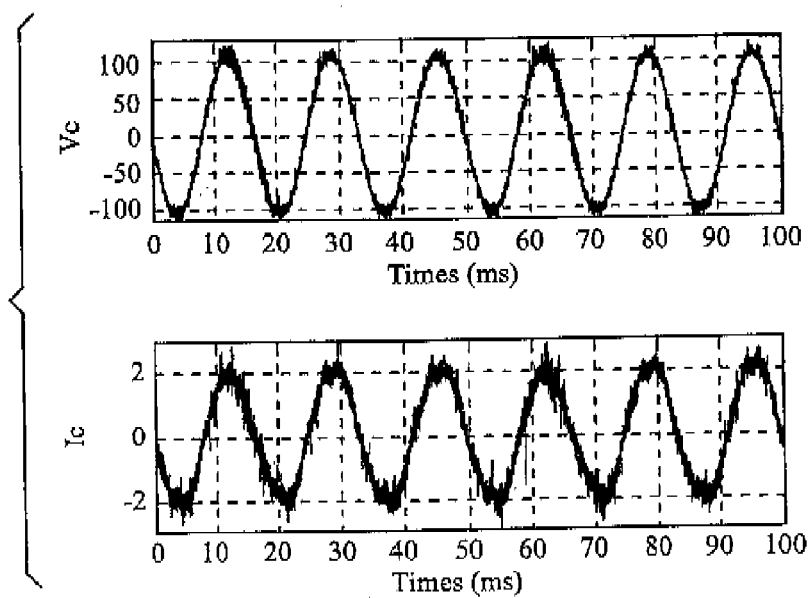
Figure 17A:
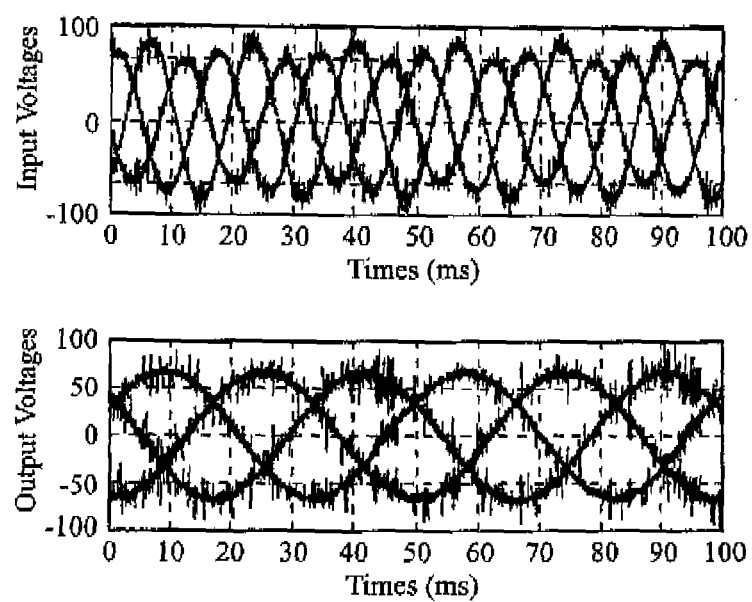
FIG. 17A includes two graphs illustrating input and the output voltages.
Figure 17B:
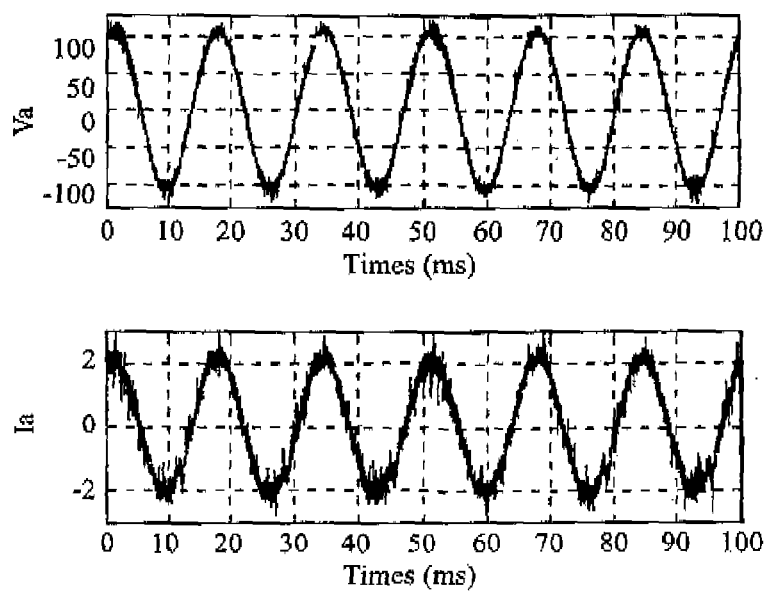
FIGS. 17B-17D are graphs illustrating input line currents.
Figure 17C:
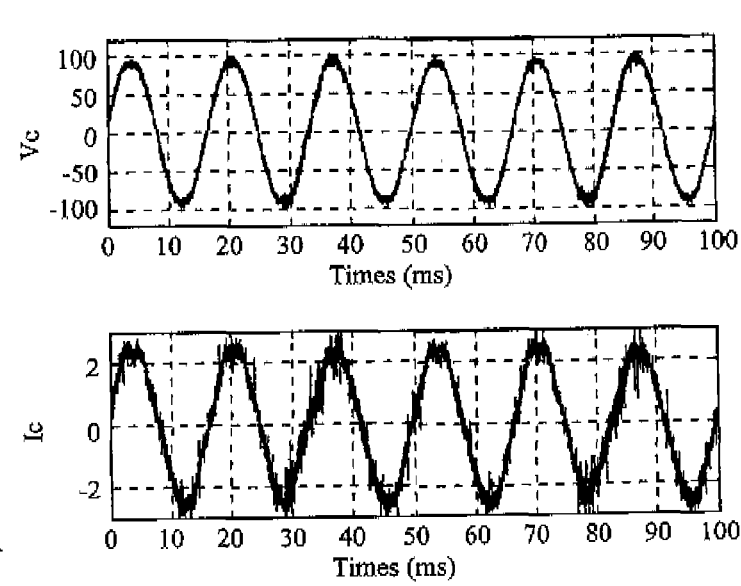
Figure 17D:
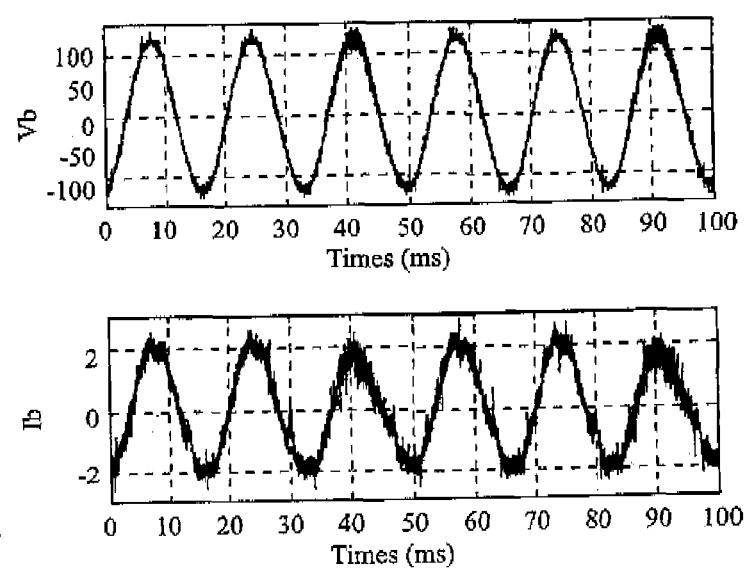

In FIG. 15A, FIG. 16A and FIG. 17A, the input and the output voltages for the three modulation methods are shown. With 15% unbalance in input voltages, the above figures show that the output voltages, measured across R of a Y-connected R-L load, are unaffected from the input unbalance. The high frequency switching ripple of the PWM output is blocked by the inductive part of the R-L load and hence approximately smooth sinusoidal voltages appear across the resistance as shown in the FIGS. 15A, 16A and FIG. 17A.

Figure 15B:
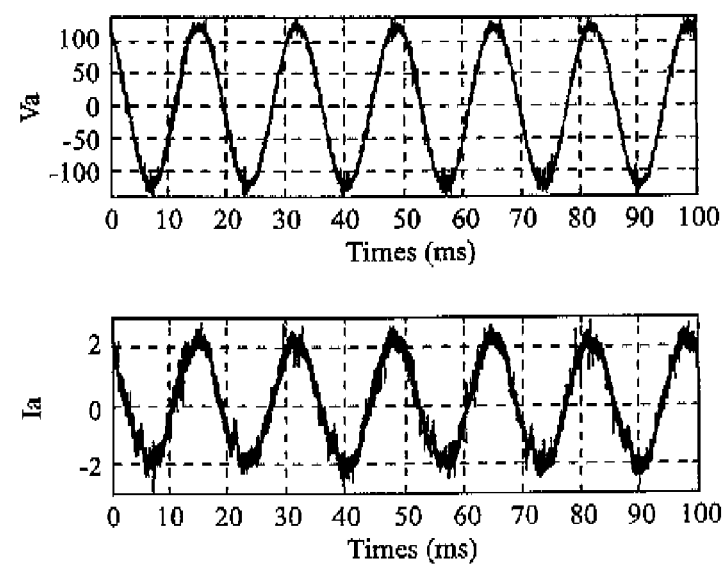
FIGS. 15B-15D are graphs illustrating the input line currents obtained by using method-I.
Figure 15C:
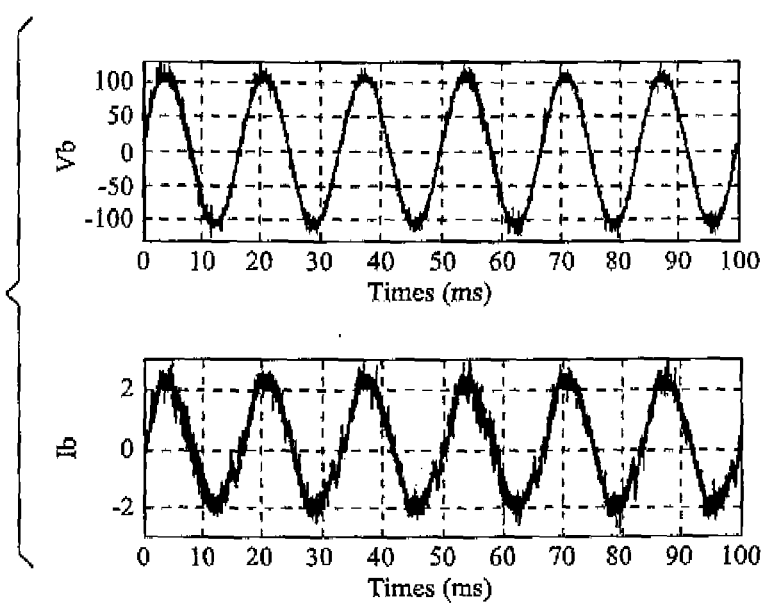
Figure 15D:
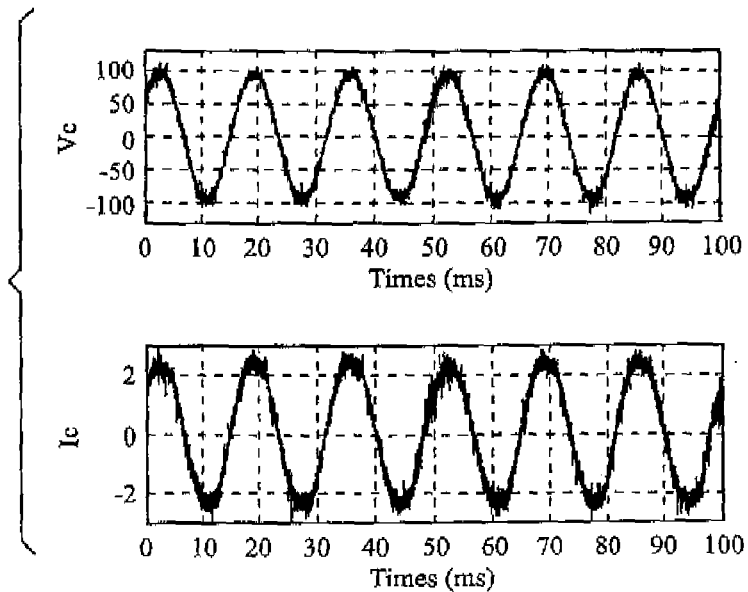

In FIGS. 15B-15D, the input line currents obtained by using method-I are shown. As can be seen the currents are sinusoidal but unbalanced. The input line currents by using the other two modulation methods are shown in FIGS. 16B-16D and FIGS. 17B-17D. Method-I has only a negative sequence component, while Method-II possess more harmonic distortion than Method-III.

The results confirm that the output voltages are balanced despite the input voltage unbalance. The output voltage range is reduced because of the input unbalance. The balanced output power results in unbalanced input currents. The maximum line-to-line balanced output voltage that can be obtained when the input voltage has an unbalance is $1.5*(\hat{V}_\rho - \hat{V}_N)$. The maximum output voltage that is obtained using any of the modulation methods is the same but the harmonic spectrum of the input current distinguishes these methods. The experimental results confirm the validity of the novel carrier based PWM control of matrix converter for unbalanced input voltages.

Figure 18:
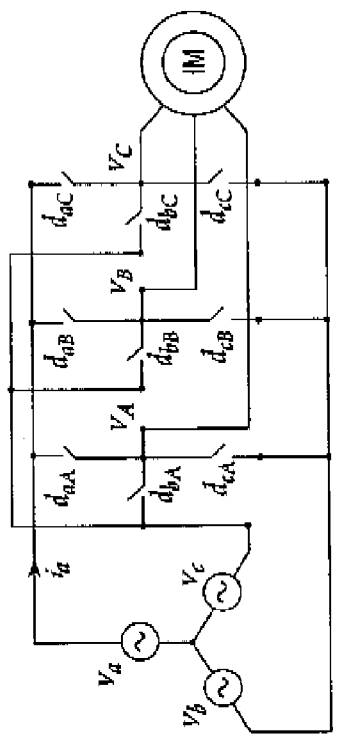
FIG. 18 is a schematic diagram illustrating a matrix converter.

A Speed-Sensorless Direct Torque Control Scheme For Matrix Converter Driven Induction Motor Below, a direct torque control (DTC) scheme using simplified carrier based modulation of a matrix converter (FIG. 18) is described. A simple technique for the design of the flux and torque controllers is also presented.

The direct torque control of the induction motor is achievable by injecting voltages of proper magnitude and phase across the stator winding from the matrix converter. A simplified carrier based modulation scheme is used to control the input power factor and the output voltages of the matrix converter. The input power factor control is inherent in the carrier based PWM generation algorithm. This is an added advantage of the carrier based control method as compared to hysteretic control.

Figure 19:
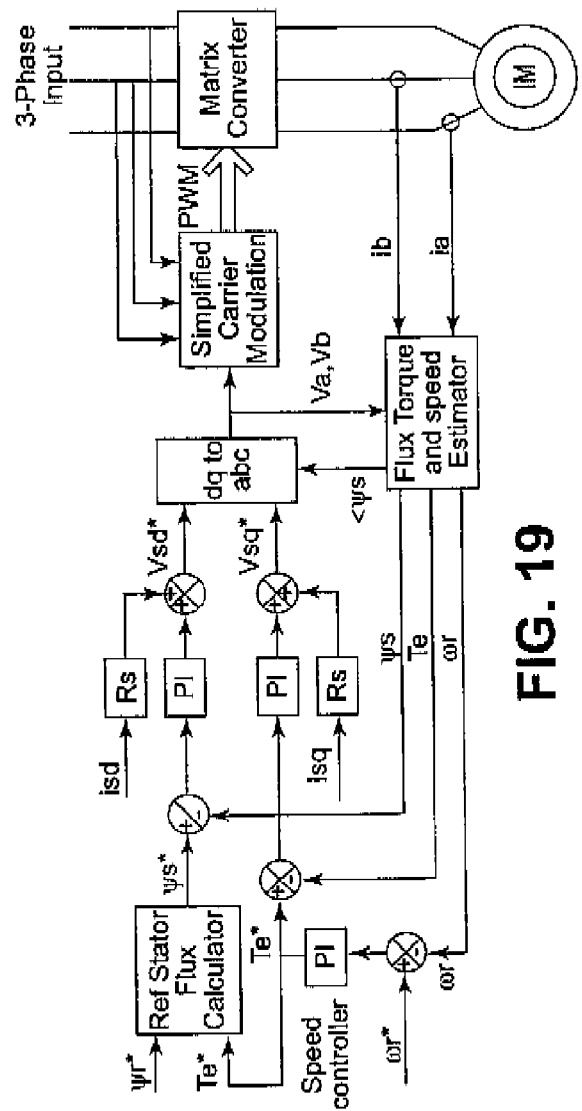
FIG. 19 is a schematic diagram showing a DTC system with carrier based PWM controlled matrix converter.

FIG. 19 shows the DTC system with carrier based PWM controlled matrix converter. The flux and torque are estimated using the conventional voltage model based estimators for DTC. The speed is estimated from an adaptive observer. The torque command generated from the speed controller along with the desired rotor flux amplitude calculates the amplitude of command stator flux. From the commanded values of the stator flux and electromagnetic torque the control voltages are generated by two PI controllers with a feed-forward compensation for the stator resistance drop. After appropriate coordinate transformation the control voltages ($v^*_a, v^*_b, v^*_c$) can be obtained. Using the simplified carrier based modulation method, the PWM voltages are generated from the control voltages by the matrix converter.

Design of Stator Flux Controller

Figure 20:
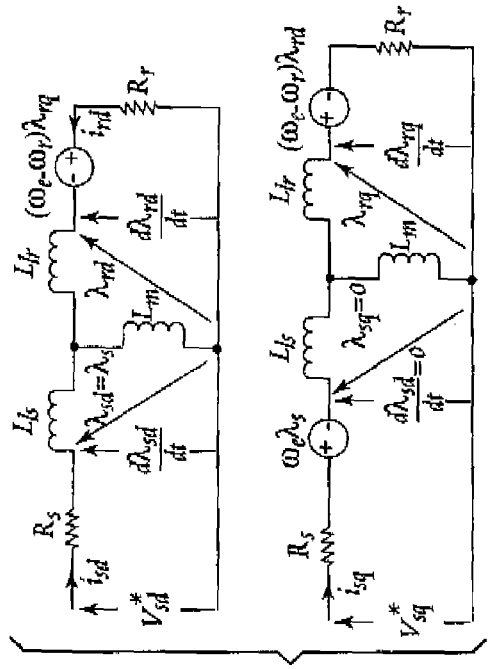
FIG. 20 is a schematic diagram illustrating a model of the induction motor in the synchronously rotating reference frame.

Unlike the hysteresis type DTC scheme the carrier based DTC uses two PI controllers for controlling the stator flux and torque. The two PI controllers must be properly tuned in order to obtain desired performance. FIG. 20 shows a model of the induction motor in the synchronously rotating reference frame. Because it is a synchronously rotating IM model there is no back emf along stator d-axis and the stator flux component along the q-axis is absent. Thus the stator flux model is represented by (1b).

$$V^*_{sd} = \frac{d\lambda_{sd}}{dt} + R_s * i_{sd} \qquad (1b)$$
$$= \frac{d\lambda_S}{dt} + R_s * i_{sd}$$

Figure 21:
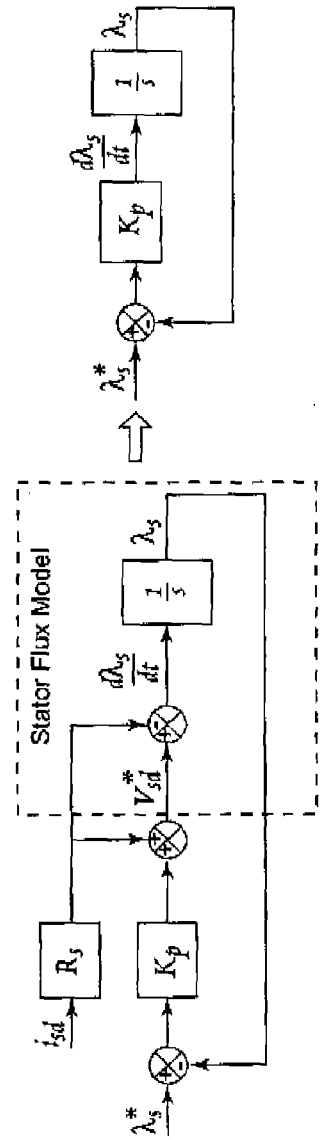
FIG. 21 is a schematic diagram illustrating the control system of stator flux represented with a feed forward compensation for stator resistance drop.

Therefore, the control system of stator flux is represented with a feed forward compensation for stator resistance drop (FIG. 21). After the feed forward compensation the system is reduced to a simple integrator and hence only a proportional controller is enough for the stator flux control (FIG. 21). But in order to implement the flux control accurate flux estimation is desired. A conventional flux estimator based on stator flux model is used for estimation.

Design of Torque Control Loop

The torque developed by the induction motor is controlled by the quadrature axis component of the stator current, which is perpendicular to the stator flux axis. The relation between quadrature axis stator voltage, stator flux and current is shown in (3b). The relation is algebraic because of the constraint that $\lambda_{sq}$ equals zero.

$$V^*_{sq} = \omega_e * \lambda_S + R_S * i_{sq} \qquad (2b)$$

From (2) it can be observed that the synchronous frequency $\omega_e$ is proportional to the quadrature axis voltage, $V^*_{sq}$ after compensation with stator resistive drop (3b).

$$\omega_e = \frac{V^*_{sq} - R_S * i_{sq}}{\lambda_S} \qquad (3b)$$

From the q-axis equivalent circuit shown in FIG. 20 the dynamics of quadrature axis stator current can be derived. The q-axis current $i_{sq}$ is directly proportional to the rotor side rotating emf term $(\omega_e - \omega_r)\lambda_{rd}$, where $\omega_r$ is the rotor frequency proportional to the speed and $\lambda_{rd}$ is the d-axis component of rotor flux. The speed dynamics is much slower than that of the torque dynamics. For the torque control loop during transient operation it is a fair approximation for the rotor flux to remain constant. Therefore for any step change in the synchronous frequency ωe, the effect of $\omega_r * \lambda_{rd}$ can be neglected in the torque dynamic.

Figure 22:
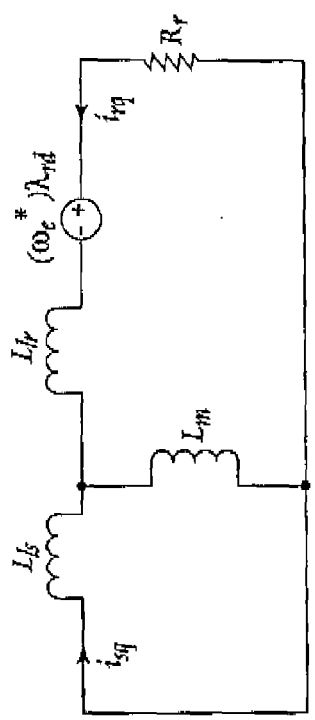
FIG. 22 is a schematic diagram illustrating a q-axis equivalent circuit.

The flux and torque variables are controlled directly by applying proper stator voltages. Hence, it is a voltage controlled system. In the control loop the effect of the stator resistance is cancelled by the addition of a feed forward term equal to the stator resistance drop. Thus the q-axis equivalent circuit can be represented as shown in FIG. 22. The stator resistance is removed from the modified q-axis equivalent circuit because of feed forward compensation. The back emf generated due to rotor speed is absent in the new equivalent circuit.

The differential equation for q-axis current obtained from the above equivalent circuits is shown in (4b)

$$\frac{\left(\frac{L_{lr}L_S}{L_m} + L_{ls}\right)}{L_{ls\_eq}} \frac{di_{sq}}{dt} + \frac{R_r + \frac{L_S}{L_m}i_{sq}}{Rr_{\_eq}} = \omega_e \times \lambda_{rd}, \qquad (4b)$$

where $L_{ls}$ is stator leakage inductance,
$L_{lr}$ is rotor leakage inductance
$L_m$ is magnetizing inductance and
$L_s$ is stator inductance.

$$\frac{L_{lr}L_S}{L_m} + L_{ls}$$

is noted by $L_{ls\_eq}$ and $$R_r \frac{L_s}{L_m}$$

is noted by $R_{r\_eq}$

Thus, (4b) can be represented by the system transfer function shown in (5b)

$$i_{sq} = \frac{\omega_e \times \lambda_{rd}}{R_{r\_eq}(\tau_{eq}S + 1)}, \quad \text{where} \qquad (5b)$$

$$\tau_{eq} \text{ is } \frac{L_{ls\_eq}}{Rr_{\_eq}}.$$

The torque is expressed by combining (3b) and (5b) into the generalized torque expression and is given in (6b).

$$T_e = \frac{P}{2} \frac{\lambda_{rd}}{R_{r\_eq}} \frac{(V_{sq}^* - R_s \times i_{sq})}{(\tau_{eq}s + 1)} \quad (6b)$$

where P is number of poles.

Figure 23:
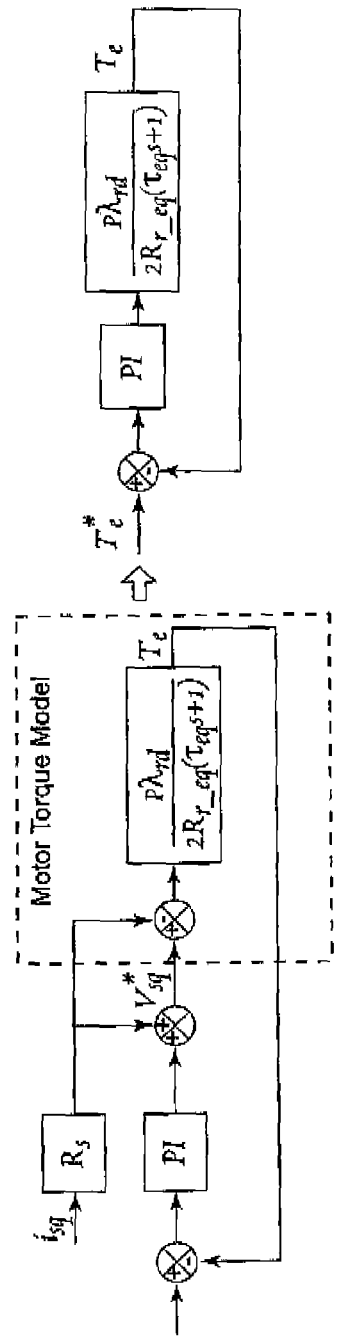
FIG. 23 is a schematic diagram illustrating a tuned PI-controller with feed forward compensation.

Thus (6b) indicates that the system transfer function can be represented by $$\frac{P\lambda_{rd}}{2R_{r\_eq}(\tau_{eq}s + 1)}$$

as shown in FIG. 23. It is a first order system. Thus a properly tuned PI-controller with a feed forward compensation for the stator resistance drop is suitable for the close loop torque control (FIG. 23). The torque is estimated from using $i_{sq}$ and $\lambda_s$ by the standard torque observers.

Speed Observer

Figure 24:
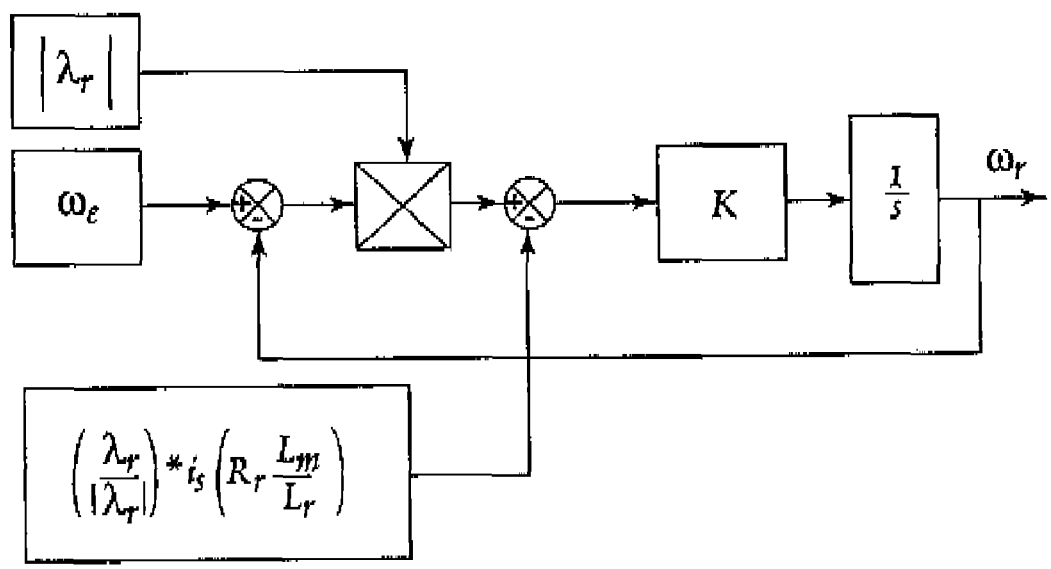
FIG. 24 is a schematic diagram illustrating an integrator for the estimation of the rotor speed.

The speed of the IM can be estimated for sensorless operation. In the proposed DTC system a simple speed estimation scheme is implemented using the estimated rotor flux ($\lambda_r$) and rotor current ($i_r$), where $\lambda_r = \lambda_{rd} + j\lambda_{rq}$ and $i_r = i_{rd} + ji_{rq}$ are their phasor representation. The error between the slip frequency generated voltage (($\omega_e - \omega_r$)|$\lambda_r$|) and the orthogonal component of the equivalent rotor resistance drop $$\left\{\left(\frac{\lambda_r}{|\lambda_r|}\right) * i_r\left(R_r\frac{L_m}{L_r}\right)\right\}$$

is fed to an integrator of appropriate gain for the estimation of the rotor speed ($\omega_r$) (FIG. 24). The estimated speed $\omega_r$ is used for the outer speed control loop. The speed control loop is slower than the torque control loop. Hence the standard technique for designing of PI controller for the speed loop is used.

PWM Voltage Generation

The command voltage for the IM is generated from the complete closed loop feedback system. The corresponding 3-phase PWM voltages are generated from the matrix converter using the simplified carrier based modulation, which uses the command voltage to get the modulation index (MI) and hence the duty ratios of the switches.

Thus, the instantaneous duty ratios of the switches in the matrix converter can be calculated and these duty ratios are then compared with a triangular carrier to generate the switching signals. The dynamic nature of IM during the torque and speed transient does not affect the input power factor.

Figure 25:
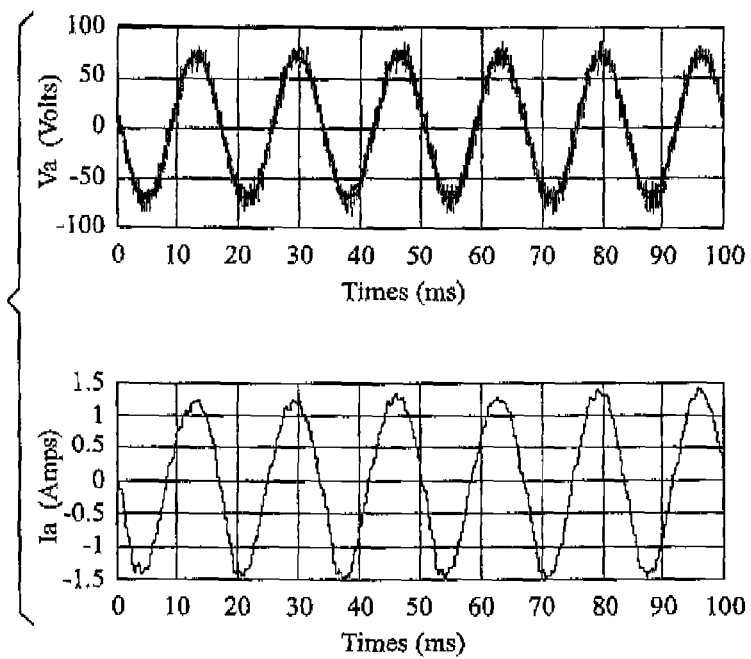
FIGS. 25 and 26 are graphs showing the input voltages and currents of phases A and B during the steady operation.
Figure 26:
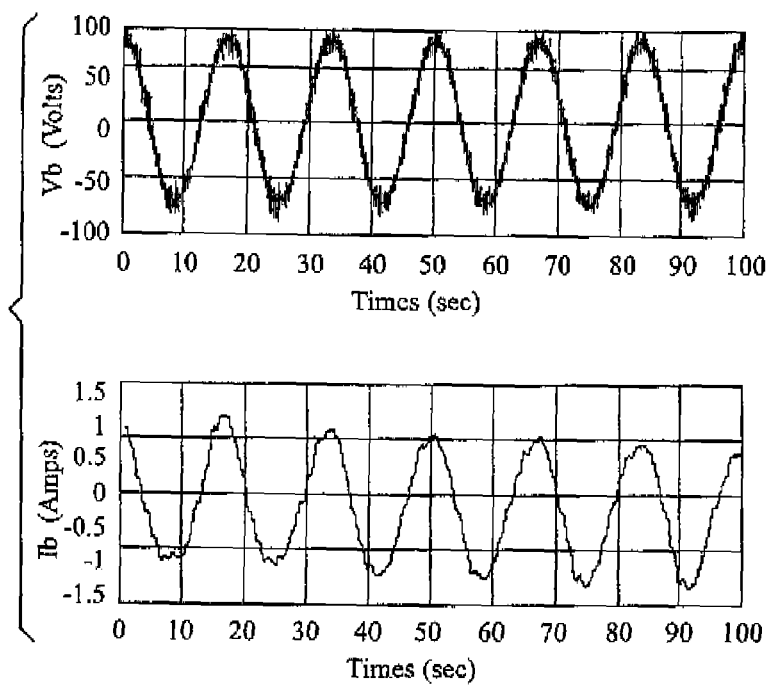

The whole control scheme with the modulation technique for matrix converter is tested in a laboratory set up comprising a 120 V 60 Hz and 120 watt induction motor, a 42V 250 watt dc motor for load, a laboratory prototype of matrix converter and 1103 DSPACE system. The experimental results are discussed below. FIGS. 25 and 26 show the input voltages and currents of phases A and B during the steady operation. It can be seen that the currents are sinusoidal and in phase with the voltages meaning that the power factor is unity.

Figure 27:
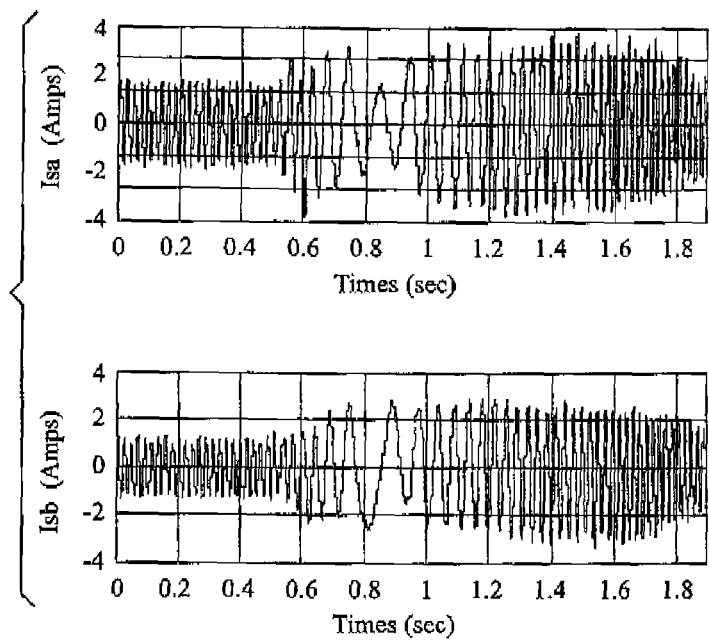
FIG. 27 includes two graphs illustrating the stator currents in the phases A and B of IM for a speed reversal operation.
Figure 28:
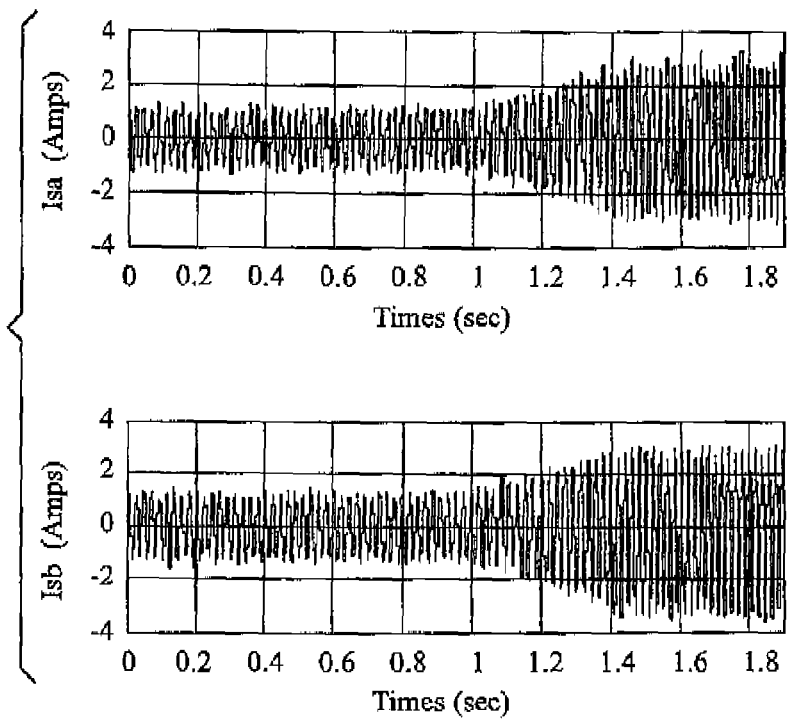
FIG. 28 includes two graphs illustrating the system being tested for step change in loads from no load to full load.
Figure 29:
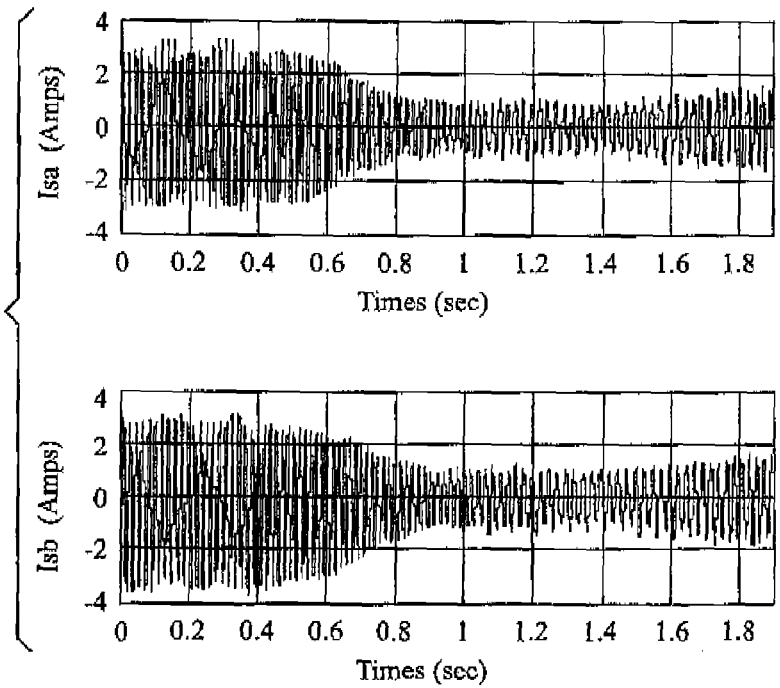
FIG. 29 includes two graphs illustrating the system being tested for step change in loads from full load to no load.
Figure 30:
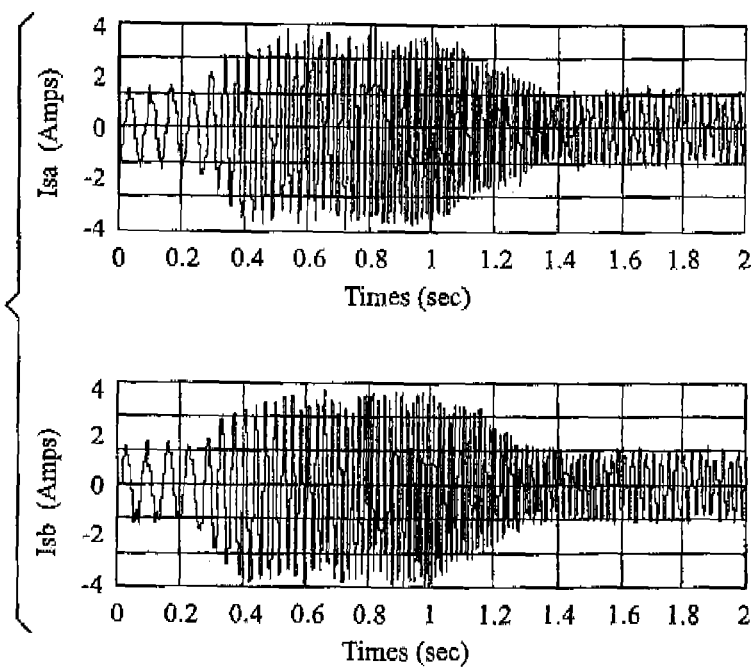
FIG. 30 includes two graphs illustrating stator currents.

FIG. 27 shows the stator currents in the phases A and B of IM for speed reversal operation from 1000 rpm to –1000 rpm. The frequency of motor current is changing smoothly in the speed reversal operation. The system is tested for step change in load s from no load to full load (FIG. 28) as well as from full load to no load (FIG. 29). The controller responds to the load change and the amplified load current can be observed in the stator current waveforms. The case in which there is a disturbance in the reference speed is also tested and FIG. 30 shows the stator currents in response to the change in the reference speed.

The input current to the matrix converter is examined during the transient operation. The amplified load current is reflected in the amplified input and the input power factor is unity during entire transient operation.

A speed sensorless direct torque control scheme for a matrix converter driven induction motor has been presented. The simplified carrier based modulation technique for matrix converter is used for generation of PWM in the above scheme. The design procedure for flux controller and torque controller is also discussed. A simple speed observation scheme is also presented. The whole scheme was experimentally verified and the results confirm that the unity power factor operation of matrix converter is maintained during all transient operations. The proposed scheme confirms that the matrix converter with carrier based modulation can be used for any sort of dynamic operation of 3-phase motor loads. The DTC scheme is tested with an available lower rated IM (0.5 HP).

Various embodiments of the invention have been described. These and other embodiments are within the scope of the following claims.

The invention claimed is:

1. A matrix converter comprising:
   a plurality of switches that electrically connect a multi-phase input voltage source to a multi-phase load; and
   a controller to output pulse-width modulated (PWM) switching signals to control the switches to produce a multi-phase output voltage from the multi-phase input voltage source,
   wherein the controller outputs the PWM switching signals by modulating a carrier signal with a time-varying signal having a frequency determined from a desired output frequency for the output voltage, and
   wherein the controller applies the time varying signal as a modulation index $k_A$, with the desired output frequency $\omega_o$ for modulating the carrier wave used to generate the PWM switching signals.

2. The matrix converter of claim 1, wherein the controller outputs the PWM switching signals to close the switches at duty ratios that produce the output voltage independent of a frequency of the input voltage.

3. The matrix converter of claim 1, where the multi-phase input voltage source and the multi-phase output voltage source have at least three phases.

4. The matrix converter of claim 1, wherein the controller is integrated within a motor.

5. The matrix converter of claim 1, wherein the controller is a power-generation windmill.

6. The matrix converter of claim 1, wherein the multi-phase input voltage source supplies unbalanced input voltages.

7. The matrix converter of claim 1, wherein the controller generates modulation indices for the switches for each output phase of the multi-phase output voltage positive and negative sequence components of the input voltage.

8. The matrix converter of claim 2, wherein the controller applies a common-mode offset D to all of the duty ratios for a given phase to ensure that the duty ratio of each individual switch is always positive in the time domain.

9. The matrix converter of claim 2, wherein the controller increases each of the duty ratios by an additional common mode term A to ensure that, for a given one of the phases, of the multi-phase output voltage at least one of the switches is closed at substantially any time within a switching cycle for the controller.

10. The matrix converter of claim 8, wherein the controller computes the common-mode offset as a function of a frequency of the input voltage.

11. The matrix converter of claim 6, wherein the controller generates the multi-phase output voltage from the unbalanced multi-phase input voltage using three-phase to stationary two-phase transformation.

12. The matrix converter of claim 7, wherein the controller generates the modulation indices as instantaneous modulation indices based on both an amplitude and a phase of resultant and reference voltage vectors.

13. A matrix converter comprising:
    a plurality of switches that electrically connect a multi-chase input voltage source to a multi-phase load; and
    a controller to output pulse-width modulated (PWM) switching signals to control the switches to produce a multi-phase output voltage from the multi-phase input voltage source,
    wherein the controller outputs the PWM switching signals by modulating a carrier signal with a time-varying signal having a frequency determined from a desired output frequency for the output voltage,
    wherein the controller utilizes a speed sensorless direct torque control scheme to generate the PWM switching signals and control the matrix converter to drive an induction motor.

14. A method for controlling a matrix converter that electrically connects a multi-phase input voltage source to a multi-phase load, the method comprising:
    modulating a carrier signal with a time-varying signal to produce at plurality of pulse-width modulated (PWM) switching signals, wherein the time-varying signal has a frequency that is a function of a desired output frequency of the output voltage, wherein modulating a carrier signal comprises applying the time varying signal as a modulation index $k_A$ with the desired output frequency $\omega_o$ for modulating the carrier wave used to generate the PWM switching signals; and
    outputting the PWM switching signals to control a plurality of switches of a matrix converter to produce a multi-phase output voltage from the multi-phase input voltage source.

15. The method of claim 14, wherein modulating a carrier signal comprises modulating the carrier signal to produce the PWM switching signals so as to close the switches for duty ratios that are independent of a frequency of the input voltage.

16. The method of claim 14, wherein modulating a carrier signal comprises increasing each of the duty ratios by an additional common mode term A to ensure that, for a given one of the phases of the multi-phase output voltage, at least one of the switches is closed at substantially any time within a switching cycle.

17. The method of claim 14, where the multi-phase input voltage source and the multi-phase output voltage source have at least three phases.

18. The method of claim 14, wherein outputting the PWM switching signals comprises outputting the PWM switching signals from a controller that is integrated within a motor.

19. The method of claim 14, wherein outputting the PWM switching signals comprises outputting the PWM switching signals from a controller that is integrated within a power-generation windmill.

20. The method of claim 14, wherein the multi-phase input voltage source supplies unbalanced input voltages.

21. The method of claim 14, wherein modulating a carrier signal comprises generating the modulation indices for the switches for each output phase of the multi-phase output voltage positive and negative sequence components of the input voltage.

22. The method of claim 15, wherein modulating a carrier signal comprises applying a common-mode offset D to all of the duty ratios for a given phase to ensure that the duty ratio of each individual switch is always positive in the time domain, 23. The method of claim 22, further comprising computing the common-mode offset as a function of a frequency of the input voltage.

24. The method of claim 20, wherein modulating a carrier signal comprises generating the multi-phase output voltage from the unbalanced multi-phase input voltage using three-phase to stationary two-phase transformation.

25. The method of claim 21, wherein modulating a carrier signal comprises generating the modulation indices as instantaneous modulation indices based on both an amplitude and a phase of resultant and reference voltage vectors.

26. A method for controlling a matrix converter that electrically connects a multi-phase input voltage source to a multi-phase load, the method comprising:
    modulating a carrier signal with a time-varying signal to produce at plurality of pulse-width modulated (PWM) switching signals, wherein the time-varying signal has a frequency that is a function of a desired output frequency of the output voltage, wherein modulating a carrier signal comprises utilizing a speed sensorless direct torque control scheme to generate the PWM switching signals and control the matrix converter to drive an induction motor; and
    outputting the PWM switching signals to control a plurality of switches of a matrix converter to produce a multi-phase output voltage from the multi-phase input voltage source.

27. A non-transitory computer-readable storage medium
comprising program instructions to cause a programmable processor to:
    modulate a carrier signal with a time-varying signal to produce at plurality of pulse-width modulated (PWM) switching signals, wherein the time-varying signal has a frequency that is a function of a desired output frequency of the output voltage, wherein the instructions cause the programmable processor to modulate the carrier signal by applying the time varying signal as a modulation index $k_A$ with the desired output frequency $\omega_o$ for modulating the carrier wave used to generate the PWM switching signals; and
    output the PWM switching signals to control a plurality of switches of a matrix converter to produce a multi-phase output voltage from the multi-phase input voltage source.

* * * * *